US012744576B2

(12) United States Patent
Nammi

(10) Patent No.: US 12,744,576 B2
(45) Date of Patent: Sep. 22, 2026

(54) NETWORK NODE, TERMINAL NODE, AND METHOD TO AVOID POWER BACK-OFF IN WIRELESS COMMUNICATION SYSTEM

(71) Applicant: TELEFONAKTIEBOLAGET LM ERICSSON (PUBL), Stockholm (SE)

(72) Inventor: Sairamesh Nammi, Austin, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 310 days.

(21) Appl. No.: 18/576,204

(22) PCT Filed: Jul. 9, 2021

(86) PCT No.: PCT/IB2021/056170
§ 371 (c)(1),
(2) Date: Jan. 3, 2024

(87) PCT Pub. No.: WO2023/281301
PCT Pub. Date: Jan. 12, 2023

(65) Prior Publication Data
US 2024/0333354 A1 Oct. 3, 2024

(51) Int. Cl.
*H04B 7/06* (2006.01)
*H04B 7/0456* (2017.01)
*H04L 27/34* (2006.01)

(52) U.S. Cl.
CPC ......... *H04B 7/0626* (2013.01); *H04B 7/0456* (2013.01); *H04B 7/0632* (2013.01); *H04L 27/34* (2013.01)

(58) Field of Classification Search
None
See application file for complete search history.

(56) References Cited

U.S. PATENT DOCUMENTS

2012/0275313 A1 11/2012 Prasad et al.
2015/0030092 A1* 1/2015 Krishnamurthy .... H04B 7/0421 375/267
2015/0085767 A1* 3/2015 Einhaus .................. H04L 5/003 370/329
2017/0195029 A1* 7/2017 Nammi ............. H04L 25/03955
2022/0393709 A1* 12/2022 Kutz .................... H04B 1/0475
2024/0333354 A1* 10/2024 Nammi ................... H04L 27/34

OTHER PUBLICATIONS

ETSI TS 138 104 V15.3.0 (Oct. 2018), 5G; NR; Base Station (BS) radio transmission and reception (3GPP TS 38.104 version 15.3.0 Release 15).

* cited by examiner

*Primary Examiner* — Hassan A Phillips
*Assistant Examiner* — Gautam Sharma

(57) ABSTRACT

A network node (and a method implemented thereby) and a terminal node (and a method implemented thereby) are described herein, all of which are configured to avoid a power back-off problem with power amplifiers in the network node while at the same time meeting the standardized EVM (Error Vector Magnitude) requirements of the wireless communication system.

18 Claims, 19 Drawing Sheets

300
AM/AM CURVE
1.4
1.2
1.0
0.8
0.6
0.4
0.2
0.0
Vo
302
304
GaAs
CMOS
0.00
0.05
0.10
0.15
0.20
0.25
0.30
0.35
Vin 400
10
0
-10
-20
-30
-40
-50
-60
-70
-80
-90
-100
POWER
SPECTRAL
DENSITY
(dB/Hz)
NON-LINEAR PA
IDEAL PA
114
114
402
112
112
404
404
-60
-40
-20
0
20
40
60
FREQUENCY (MHz)

2000

2020
APPLICATION/VIRTUAL APPLIANCE/ VIRTUAL NODE OR SERVER/INSTANCE
APPLICATION
VM
2040
2050
VIRTUALIZATION LAYER
HW
PROCESSING CIRCUITRY
2060
2090-1
MEMORY
INSTRUCTIONS
2095
NIC
PHYSICAL NI
2080
2070
2090-2
NON TRANSITORY STORAGE
2030
ANTENNA(S)
20225
20200
RADIO UNIT
RECEIVER
20210
TRANSMITTER
20220
20230
CONTROL SYSTEM
20100
MANAGEMENT AND ORCHESTRATI ON

NETWORK NODE, TERMINAL NODE, AND METHOD TO AVOID POWER BACK-OFF IN WIRELESS COMMUNICATION SYSTEM

PRIORITY CLAIM

This application is a national stage of International Application No. PCT/IB2021/056170, filed Jul. 9, 2021, the disclosure of which is hereby incorporated by reference in its entirety for all purposes.

TECHNICAL FIELD

The present disclosure relates to a network node (and a method implemented thereby) and a terminal node (and a method implemented thereby) all of which are configured to avoid a power back-off problem with power amplifiers in the network node while meeting the standardized EVM (Error Vector Magnitude) requirements of the wireless communication system.

BACKGROUND

To meet the huge demand for data centric applications, 3rd Generation Partnership Project (3GPP) has extended the 4G standards to 5G which is also called New Radio (NR) access. 5G systems have a variety of requirements some of which are as follows:

Data rates of several tens of megabits per second should be supported for tens of thousands of users.

1 gigabit per second to be offered simultaneously to tens of workers on the same office floor.

Several hundreds of thousands of simultaneous connections to be supported for massive sensor deployments.

Spectral efficiency should be significantly enhanced compared to 4G.

Coverage should be improved.

Signaling efficiency should be enhanced.

Latency should be reduced significantly when compared to LTE.

Multiple-Input and Multiple-Output (MIMO) systems are well known to significantly increase the data carrying capacity of wireless systems. For this reason, MIMO is an integral part of the $3^{rd}$ and $4^{th}$ generation wireless systems. Likewise, 5G systems employ MIMO systems which are referred to therein as massive MIMO systems because they can have hundreds of antennas at the transmitter side and the receiver side. The massive MIMO systems typically use the terminology ($N_t$, $N_r$) where $N_t$ denotes the number of transmit antennas, and $N_r$ denotes the number of receive antennas. In the massive MIMO systems, the peak data rates are multiplied by a factor of $N_t$ when compared to data rates of single antenna systems in a rich scattering environment.

1. Message Sequence Chart for Downlink Data Transfer

FIG. 1 (PRIOR ART) shows a conventional message sequence chart for downlink data transfer from a network node 102 (e.g., gNB 102) to a terminal node 104 (e.g., User Equipment (UE) 104) in a 5G system. At step 1, the gNB 102 transmits downlink pilot or reference signals 106 (shown as cell specific/UE specific reference signals 106) to the UE 104. At step 2, the UE 104 utilizes the received cell specific/UE specific reference signals 106 to compute channel estimates and parameters needed for Channel State Information (CSI) reporting. The CSI report 108 can include, for example, a channel quality indicator (CQI), a precoding matrix index (PMI), rank information (RI), CSI Reference Signal (CSI-RS) Resource Indicator (CRI, the same as beam indicator), etc. . . . At step 3, the UE 104 transmits the CSI report 108 via a feedback channel 109 (e.g., uplink control channel 109) to the gNB 102. The UE 104 transmits the CSI report 108 upon receipt of an a-periodical request from the gNB 102. Or, the UE 104 can be configured to periodically transmit the CSI report 108 to the gNB 102. At step 4, the gNB 102 and in particular its network scheduler unit uses the CSI report 108 when choosing scheduling parameters 110 for scheduling downlink data 112 to be transmitted to the UE 104. At step 5, the gNB 102 transmits the scheduling parameters 110 to the UE 104 via a downlink control channel 111 (e.g., using Downlink Channel Information (DCI)). At step 6, the gNB 102 transmits the data 112 to the UE 104 via a data traffic channel 113.

1.1 Downlink Reference Signals 106

The downlink reference signals 106 are predefined signals occupying specific resource elements within a downlink time-frequency grid. There are several types of downlink reference signals 106 that can be transmitted in different ways and which are used for different purposes by the UE 104 as follows:

CSI reference signals (CSI-RS): These downlink reference signals 106 are specifically intended to be used by UE 104 to acquire channel-state information (CSI) and beam specific information (beam RSRP). In 5G, CSI-RS 106 is UE-specific so it can have a significantly lower time/frequency density.

Demodulation reference signals (DM-RS): These downlink reference signals 106 also sometimes referred to as UE-specific reference signals are specifically intended to be used by UE 104 for channel estimation for the data traffic channel. The label "UE-specific" relates to the fact that each demodulation reference signal is intended for channel estimation by a single UE. Each specific demodulation reference signal 106 is then only transmitted within the resource blocks assigned for data traffic channel transmission to that specific UE 104.

1.2 Uplink Control Channel 109

The uplink control channel 109 carries information about HARQ-ACK information corresponding to the downlink data transmission, and channel state information (CSI report 108). The channel state information (CSI report 108) typically includes CRI, RI, CQI, and PMI.

1.3 Downlink Control Channel 111

The downlink control channel 111 (e.g., PDCCH) carries information about scheduling parameters 110 for the UE 104. Typically, the scheduling parameters 110 include a number of MIMO layers scheduled, transport block sizes, modulation for each codeword, parameters related to HARQ, sub-band locations and PMI corresponding to those sub-bands.

2. Block Diagram of an Adaptive Communication System 200

FIG. 2 (PRIOR ART) illustrates a general block diagram of a conventional adaptive communication system 200 including the network node 102 (e.g., gNB 102) and the terminal node 104 (e.g., UE 104). The network node 102 and terminal node 104 each include many well-known components, but for clarity, only the components needed to describe the features relevant to the present disclosure are shown and described herein. The network node 102 includes a base band unit 202, a RF chain 204, antenna ports 206, and a scheduler unit 208. The baseband unit 202 receives input bits 210 from upper layers (not shown) and scheduler decisions 212 from the scheduler unit 208 and outputs a baseband signal 214. More specifically, the input bits 210 are passed through the baseband unit 202 which typically includes a channel encoder, interleaver and rate matching, modulator, layer mapper, OFDM modulator etc. Once the baseband signal 214 is generated it is passed through the RF chain 204 before it is sent to the antenna ports 206 and finally transmitted to the terminal node 104. The RF chain 204 typically includes a Crest factor reduction (CFR), a Digital pre-distortion (DPD), a Digital to Analog converter (DAC), in-phase/quadrature (I/Q) imbalance, oscillators, and power amplifiers 216 (PAs 216—are shown because they are relevant to the present disclosure). The baseband unit 202 in generating the baseband signal 214 depends on scheduler decisions 212 from the upper layers e.g., layer 2 such as the MAC layer. The scheduler decisions 212 are also influenced by the CSI report 108 and other contents of the feedback channel 109 from the terminal node 104 (receiver of baseband signal 214/data 214). For example, the terminal node 104 can use the feedback channel 109 to inform the network node 102 as to what kind of modulation, code rate, precoding matrix indicator, rank information (number of transmission layers) is suitable for data transfer at any given instance. In general, when the terminal node 104 is experiencing a good signal to noise ratio, it might prefer that the network node 102 use a higher order modulation say 256-QAM or 64-QAM to transmit the baseband signal 214. And, when the terminal node 104 is experiencing a low signal to noise ratio, it might prefer that the network node 102 use a low order modulation such as QPSK or 16-QAM to transmit the baseband signal 214. Unfortunately, the conventional adaptive communication system 200 has what is known in the art as a power back-off problem which is described next.

2.1 Impact due to Power Amplifier 216 Nonlinearity:

In general, the power amplifiers 216 in the RF chain 204 need to be operated in the non-linear region in order to achieve a good efficiency. FIG. 3 (PRIOR ART) is a graph 300 that illustrates typical amplitude-to-amplitude modulation (AM/AM) curves for gallium arsenide (GaAs) and complementary metal-oxide semiconductor (CMOs) types of power amplifiers 216. It can be observed that the voltage input/output for the GaAs curve 302 and the CMO curve 304 are highly non-linear.

However, when one of the power amplifiers 216 operates in the non-linear region, some of the transmitted signals are leaked to the other frequency bands (adjacent carrier bandwidths). FIG. 4 (PRIOR ART) is a graph 400 that illustrates the spectral re-growth due to realistic PA non-linearity. It can be seen from graph 400 that a power spectral density plot 402 is distorted, and that there is a leakage of the desired transmitted signal 112 from the non-linear PA to the adjacent channel bandwidths 404.

In the wireless communications field, the adjacent channel leakage ratio (ACLR) is used as a metric to measure the leakage due to a non-linear PA 216. In the graph 400, the ACLR with an ideal PA 216 is around −100 dBc for the transmitted signal 114, while with a realistic PA 216 (with non-linearity) the ACLR is around-38 dBc for the transmitted signal 112. In realistic PA 216 implementations, the actual ACLR value can vary.

2.2 Power Back-Off for Mitigating the Power Amplifier Nonlinearity:

One known method to compensate for the non-linearity of the power amplifier 216 is to operate the PA 216 in the linear region. This can be achieved by backing off the maximum power to the PA 216. FIG. 5 (PRIOR ART) illustrates a graph 500 which shows the AM/AM characteristics of the PA 216 with different input back-offs (IBO) 502, 504, 506, and 508. Also shown in the graph 500 is the AM/AM characteristic of an ideal linear 510 PA 216. However, when the full power is unutilized due to the non-linearity of the PA 216 the RF chain 204 introduces ACLR as well as EVM (see discussion below with respect to TABLE 1). It has been observed that when there is a large power back-off say 11.5 dB (see plot 508), then the PA 216 characteristics become linear and there does not occur any leakage thereby introducing a very low EVM. However, the total power from the PA 216 is unused. In contrast, when the power back-off is small say 0.5 dB (see plot 502), the PA 216 characteristics become nonlinear which produces adjacent channel leakages and introduces EVM.

TABLE 1 shows the minimum EVM requirement set by the current 3GPP European Telecommunications Standards Institute (ETSI) Technical Specification (TS) 38.104 "5G: NR: Base Station (BS) Radio Transmission and Reception" (version 15.3.0 Release 15), section 6.5.2.2, table 6.5.2.2-1 (the contents of this document are hereby incorporated by reference herein) for various modulation schemes for the network node 102 (e.g., NR base station 102, gNB 102, BS transmitter 102).

TABLE 1

EVM requirement of current 3GPP standard

| Modulation | % EVM |
|---|---|
| QPSK | 17.5 |
| 16-QAM | 12.5 |
| 64-QAM | 8 |
| 256-QAM | 3.5 |

As shown in TABLE 1, the 3GPP EVM requirements for higher order modulations are very tight, hence a large power back-off is needed when the network node 102 (e.g., gNodeB 102) schedules a higher order modulation scheme. For example, it is quite common to use power back-off when the network node 102 is scheduling higher order modulation schemes such as 64 QAM or 256 QAM to meet the 3GPP EVM requirements. In this way, the network node 102 (e.g., gNodeB 102) satisfies the ACLR requirement as well as 3GPP minimum EVM requirements.

However, power back-off causes inefficient use of power resources as the PA 216 is designed to operate with full power. In addition, applying power back-off when more than one terminal node 104 (e.g., UE 104) is multiplexed reduces the throughput of the terminal node(s) 104 which are using other modulation schemes such as 64QAM, 16QAM or QPSK. This in turn will reduce the data rate or throughput of the wireless system and makes 5G NR unattractive for deployment.

In view of the foregoing, there is a need for an efficient solution to avoid power back-off while at the same time meet EVM requirements so as not to adversely impact the wireless system performance. This need and other needs are addressed by the present disclosure.

SUMMARY

A network node (e.g., gNB), a terminal node (e.g., UE) and various methods for addressing the aforementioned need in the prior art are described in the independent claims.

Advantageous embodiments of the network node, the terminal node, and the various methods are further described in the dependent claims.

In one aspect, the present disclosure provides a network node (e.g., gNB) configured to interact with a terminal node (e.g., UE). The network node comprises a processor and a memory that stores processor-executable instructions, wherein the processor interfaces with the memory to execute the processor-executable instructions whereby the network node is operable to perform a compute operation, a first determine operation, a communication operation, a receive operation, a second determine operation, a first transmit operation, and a second transmit operation. In the compute operation, the network node computes an EVM of the network node. In the first determine operation, the network node determines a rank restriction, if any, for the terminal node based on (1) the computed EVM and (2) a geometry or path loss of the terminal node, where the determined rank restriction indicates a rank restriction required by the network node for transmitting data to the terminal node. In the communicate operation, the network node communicates, to the terminal node, rank restriction information, where the rank restriction information is based on the determined rank restriction. In the receive operation, the network node receives, from the terminal node, a CSI report which includes preferred rank information within a rank restriction set, where the preferred rank information is associated with the rank restriction information. In the second determine operation, the network node determines scheduling parameters for scheduling the terminal node, where the scheduling parameters are determined using at least the preferred rank information in the CSI report. In the first transmit operation, the network node transmits, to the terminal node, the scheduling parameters. In the second transmit operation, the network node transmits, to the terminal node, the data based on the scheduling parameters. An advantage associated with this specially configured network node is that by performing the aforementioned operations it provides an efficient solution to avoid the power back-off problem while at the same time meet EVM requirements so as not to impact the wireless system performance.

In another aspect, the present disclosure provides a method implemented by a network node (e.g., gNB) configured to interact with a terminal node (e.g., UE). The method comprising a computing step, a first determining step, a communicating step, a receiving step, a second determining step, a first transmitting step, and a second transmitting step. In the computing step, the network node computes an EVM of the network node. In the first determining step, the network node determines a rank restriction, if any, for the terminal node based on (1) the computed EVM and (2) a geometry or path loss of the terminal node, where the determined rank restriction indicates a rank restriction required by the network node for transmitting data to the terminal node. In the communicating step, the network node communicates, to the terminal node, rank restriction information, where the rank restriction information is based on the determined rank restriction. In the receiving step, the network node receives, from the terminal node, a CSI report which includes preferred rank information within a rank restriction set, where the preferred rank information is associated with the rank restriction information. In the second determining step, the network node determines scheduling parameters for scheduling the terminal node, where the scheduling parameters are determined using at least the preferred rank information in the CSI report. In the first transmitting step, the network node transmits, to the terminal node, the scheduling parameters. In the second transmitting step, the network node transmits, to the terminal node, the data based on the scheduling parameters. An advantage of this method is that by the network node performing the aforementioned steps it provides an efficient solution to avoid the power back-off problem while at the same time meet EVM requirements so as not to impact the wireless system performance.

In yet another aspect, the present disclosure provides a terminal node (e.g., UE) configured to interact with a network node (e.g., gNB). The terminal node comprises a processor and a memory that stores processor-executable instructions, wherein the processor interfaces with the memory to execute the processor-executable instructions whereby the terminal node is operable to perform a first receive operation, a compute operation, a communicate operation, a second receive operation, and a third receive operation. In the first receive operation, the terminal node receives, from the network node, rank restriction information which indicates the rank restriction required by the network node for transmitting data to the terminal node. In the compute operation, the terminal node computes a CSI report which includes preferred rank information within a rank restriction set, where the preferred rank information is based on the received rank restriction information. In the communicate operation, the terminal node communicates, to the network node, the computed CSI report including the preferred rank information. In the second receive operation, the terminal node receives, from the network node, scheduling parameters on a downlink control channel, where the scheduling parameters are based in part on the preferred rank information in the CSI report. In the third receive operation, the terminal node receives, from the network node, the data. An advantage associated with this specially configured terminal node is that by performing the aforementioned operations it provides an efficient solution to avoid the power back-off problem while at the same time meet EVM requirements so as not to impact the wireless system performance.

In yet another aspect, the present disclosure provides a method implemented by a terminal node (e.g., UE) configured to interact with a network node (e.g., gNB). The method comprises a first receiving step, a computing step, a communicating step, a second receiving step, and a third receiving step. In the first receiving step, the terminal node receives, from the network node, rank restriction information which indicates the rank restriction required by the network node for transmitting data to the terminal node. In the computing step, the terminal node computes a CSI report which includes preferred rank information within a rank restriction set, where the preferred rank information is based on the received rank restriction information. In the communicating step, the terminal node communicates, to the network node, the computed CSI report including the preferred rank information. In the second receiving step, the terminal node receives, from the network node, scheduling parameters on a downlink control channel, where the scheduling parameters are based in part on the preferred rank information in the CSI report. In the third receiving step, the terminal node receives, from the network node, the data. An advantage associated with this method implemented by the terminal node is that by performing the aforementioned steps it provides an efficient solution to avoid the power back-off problem while at the same time meet EVM requirements so as not to impact the wireless system performance.

Additional aspects of the present disclosure will be set forth, in part, in the detailed description, figures and any claims which follow, and in part will be derived from the detailed description or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 1:
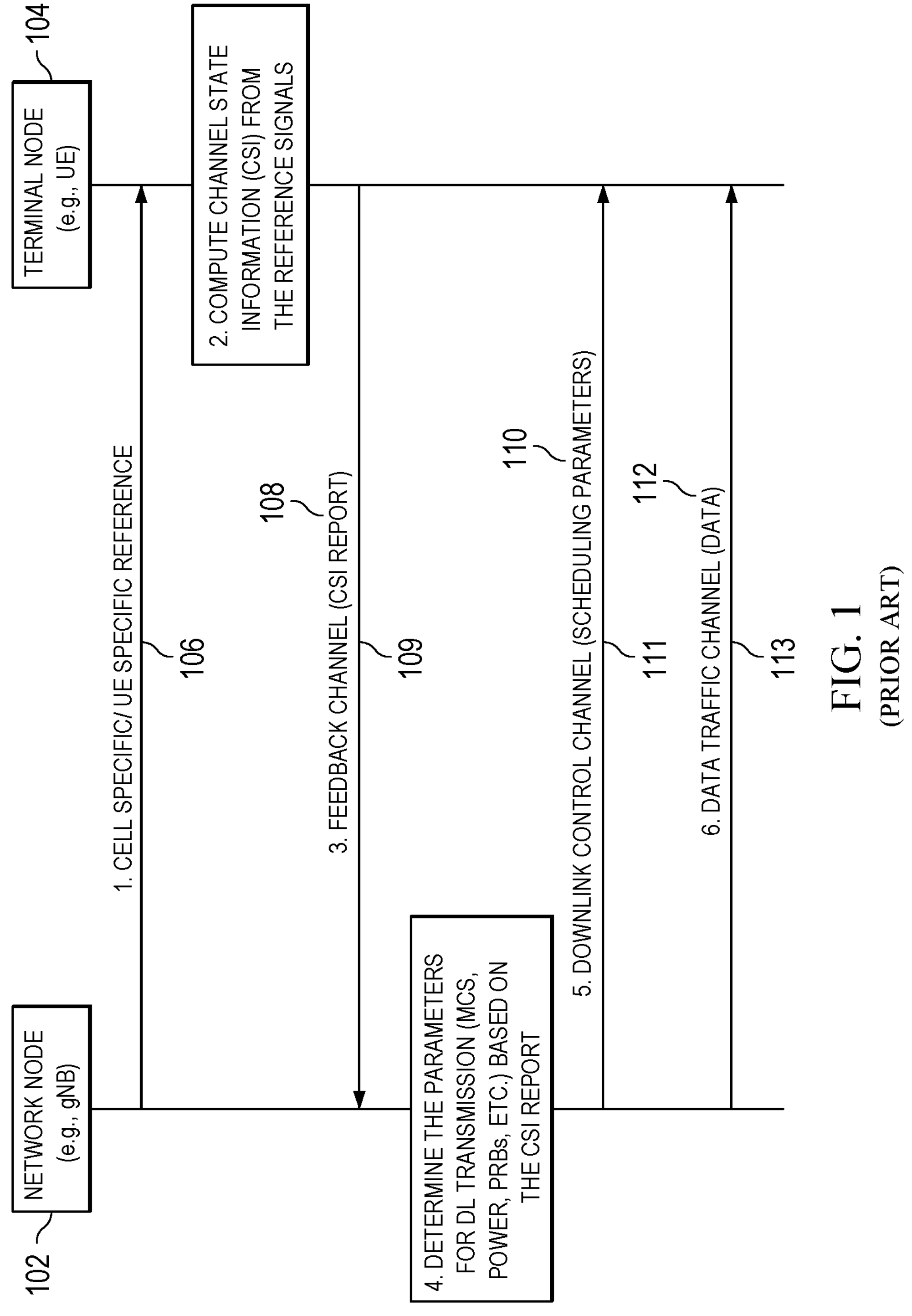
FIG. 1 (PRIOR ART) is a conventional message sequence chart for downlink data transfer from a network node (e.g., gNB) to a terminal node (e.g., UE) in a 5G system.

The present disclosure has certain aspects and embodiments described hereinafter which provide solutions to the aforementioned need or other challenges which are associated with the prior art. In this regard, the solutions described hereinafter facilitate a low complexity adaptive wireless communication system which can meet the current (and future) 3GPP standard requirements for EVM while at the same time avoid the power back-off by utilizing the complete power of the power amplifier. The main idea is to configure the network node (e.g., gNB) to send rank restriction information to the terminal node (e.g., UE, wireless device) when certain conditions are satisfied to avoid scheduling of higher order modulations (e.g., 64-QAM, 256-QAM) when sending data to the terminal node. Further, the main idea is to configure the terminal node to receive the rank restriction information and then transmit to the network node control information (e.g., CSI report) which includes preferred rank restriction within a rank restriction set that indicates the network node is to avoid scheduling of higher order modulations (e.g., 64-QAM, 256-QAM) when sending data to the terminal node.

The main idea and various embodiments thereof are described in detail below with respect to FIGS. 11-17 after a brief discussion about exemplary components of the wireless communication system and a brief discussion about the conventional rank selection algorithm in a 5G network including the observations made when developing the main idea and various embodiments of the present disclosure.

3. Exemplary Components of Wireless Communication System

In the embodiments discussed below, the non-limiting term radio network node or simply network node 1102 is used. This term refers to any type of network node that serves terminal node(s) (e.g., UEs) and/or is connected to other network node(s) or network element(s) or any radio node(s) from where the terminal node (e.g., UE) receives signals. Examples of radio network nodes are gNode B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, remote radio unit (RRU), Remote Radio Head (RRH), nodes in distributed antenna system (DAS) etc. . . .

In some embodiments the non-limiting term terminal node 1104 is used. This term refers to any type of wireless device that communicates with a radio network node in a cellular or mobile communication system. Examples of the terminal node are UE, target device, device to device (D2D) UE, machine type UE or UE capable of machine to machine (M2M) communication, PDA, iPad, Tablet, mobile terminals, smart phone, laptop embedded equipped (LEE), laptop mounted equipment (LME), Universal Serial Bus (USB) dongles etc. . . .

Further, the embodiments described herein have been described with respect to NR 5G. However, the embodiments are applicable to any Radio Access Technology (RAT) or multi-RAT system where the UE operates using multiple carriers e.g., LTE FDD/TDD, GSM/GERAN, WiFi, WLAN, WiMax, CDMA2000 etc. In addition, the embodiments are applicable to single carrier as well as to multicarrier (MC) or carrier aggregation (CA) operation of the UE. The term carrier aggregation (CA) is also called (e.g., interchangeably called) “multi-carrier system”, “multi-cell operation”, “multi-carrier operation”, “multi-carrier” transmission and/or reception. Note that the solutions outlined equally apply for Multi RAB (radio bearers) on some carriers (that is data plus speech is simultaneously scheduled).

4. Rank Selection Algorithm in 5G System

Considering a single-cell scenario having perfect time and synchronization, a MIMO received system model is as follows:

$$Y = \underbrace{R_r^{1/2} H_{IID} R_t^{1/2}}_{H} W_{PMI} x + n = H W_{PMI} x + n, \tag{1}$$

where $Y \in X^{N_r \times 1}$ corresponds to a received signal vector, and $H \in X^{N_r \times N_t}$ describes an overall channel matrix incorporating spatial correlation $R_r \in P^{N_r \times N_r}$ of the receiver (also referred to as terminal node herein) and the spatial correlation $R_r \in P^{N_r \times N_r}$ of the transmitter (also referred to as a network node herein). A complex zero-mean Gaussian noise vector is denoted by $n \in X^{N_r \times 1}$ having a covariance $R_n$. An unknown complex data/symbol vector is denoted by $x \in A^{N_L \times 1}$ (having normalized power $E\{xx^H\}=R_x=I$) corresponding to M-QAM (e.g., QPSK, 16-QAM, 64-QAM, 256-QAM etc.) constellation. A (complex) precoder $W_{PMI} \in \Pi^{N_r \times N_L}$ is selected from a given/known codebook $\Pi$ having $N_\Pi$ number of precoders (where, PMI=$\{0,1, \ldots N_\Pi-1\}$) for a given rank$\leq \min\{N_r, N_t\}$.

Assuming a linear minimum mean square error (MMSE) detector is applied at the receiver, the post-processing SINR per $i^{th}$ spatial layer for a given PMI, is given by $$SINR_i = \frac{1}{\left[\left(W_{PMI}^H H^H R_n^{-1} H W_{PMI} + I_{N_L}\right)^{-1}\right]_{i,i}} - 1 \tag{2}$$

where $[A]_{i,i}$ corresponds to an $i^{th}$ diagonal element of a matrix A.

In order to estimate a suitable PMI/RI, the so-called link-quality metric (LQM), e.g., mean mutual information, denoted as mMI (per sub-band/wide-band) is computed, as given below:

$$mMI(PMI, RI) = \left(\frac{1}{K \cdot \text{rank}}\right) \sum_{k=1}^{K} \sum_{i=1}^{RI=rank} I(SINR_i[k]), \tag{3}$$

Where, I ($SINR_i$[k]) is mutual information that is a function of post-processing $SINR_i$ [k] (and modulation alphabet) as given in TABLE 2 for $i^{th}$ spatial layer and kth resource-element. The number of resource-elements employed for the computation of the aforementioned LQM is given by a parameter K (depending on the wide-band/sub-band PMI estimate). RI=rank hypothesis, say for example maximum rank=4, then in the hypothesis test RI=1, RI=2, RI=3 and RI=4.

TABLE 2

Mutual information for 4-QAM. 16-QAM and 64-QAM.

| Modulation Alphabet | Mutual Information per symbol |
|---|---|
| 4-QAM | $I(SINR) = J(\sqrt{4SINR_i})$ |
| 16-QAM | $I(SINR) \approx (1/2)J(0.8818\sqrt{SINR_i}) + (1/4)J(1.6764\sqrt{SINRi}) + (1/4)J(0.9316\sqrt{SINRi})$ |
| 64-QAM | $I(SINR) \approx (1/3)J(1.1233\sqrt{SINR_i}) + (1/3)J(0.4381\sqrt{SINRi}) + (1/3)J(0.4765\sqrt{SINRi})$ |

$$J(a) \approx \begin{cases} = 0.04210610a^3 + 0.209252a^2 - 0.00640081a, & 0 < a < 1.6363 \\ 1 - \exp(0.00181491a^3 - 0.142675a^2 - 0.08220540a + 0.0549608), & 1.6363 < a < \infty \end{cases}.$$

After having the estimate of mMI (per sub-band/wide band), one can estimate the PMI and RI jointly employing unconstrained optimization which can be given as follows:

$$\max_{PMI,RI} mMI(PMI, RI) \tag{4}$$

Observation I: Let $SINR_i$ be the Effective SINR of the $i^{th}$ Layer. Then, it can be Observed that $$(SINR_1)_{rank=1} > (SINR_i)_{rank=2} \text{ for all } i \quad (5)$$

Similarly, $$(SINR_1)_{rank=2} > (SINR_i)_{rank=3} \text{ for all } i \quad (6)$$

Figure 6:
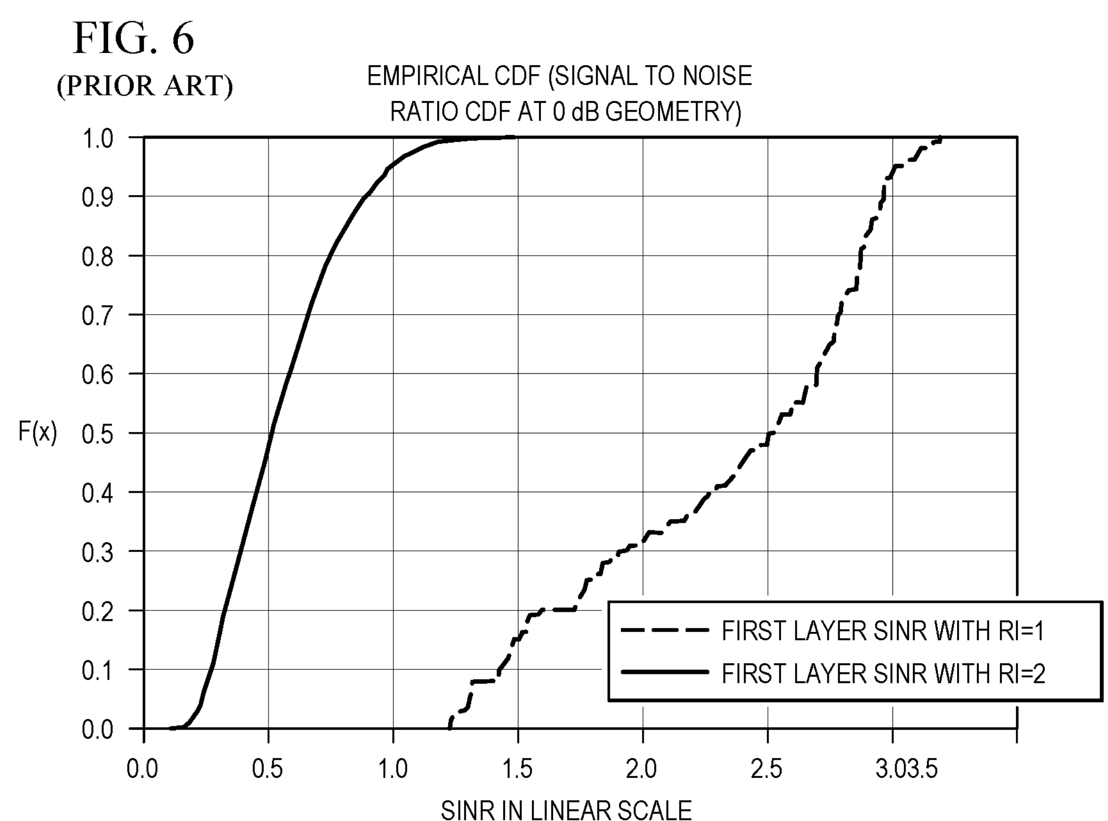
FIG. 6 (PRIOR ART) is a cumulative distribution function (CDF) plot for Signal to Interference+Noise Ratio (SINR) for rank 1 (with the best PMI) and rank 2 (with the best PMI) at 0 dB geometry.
Figure 7:
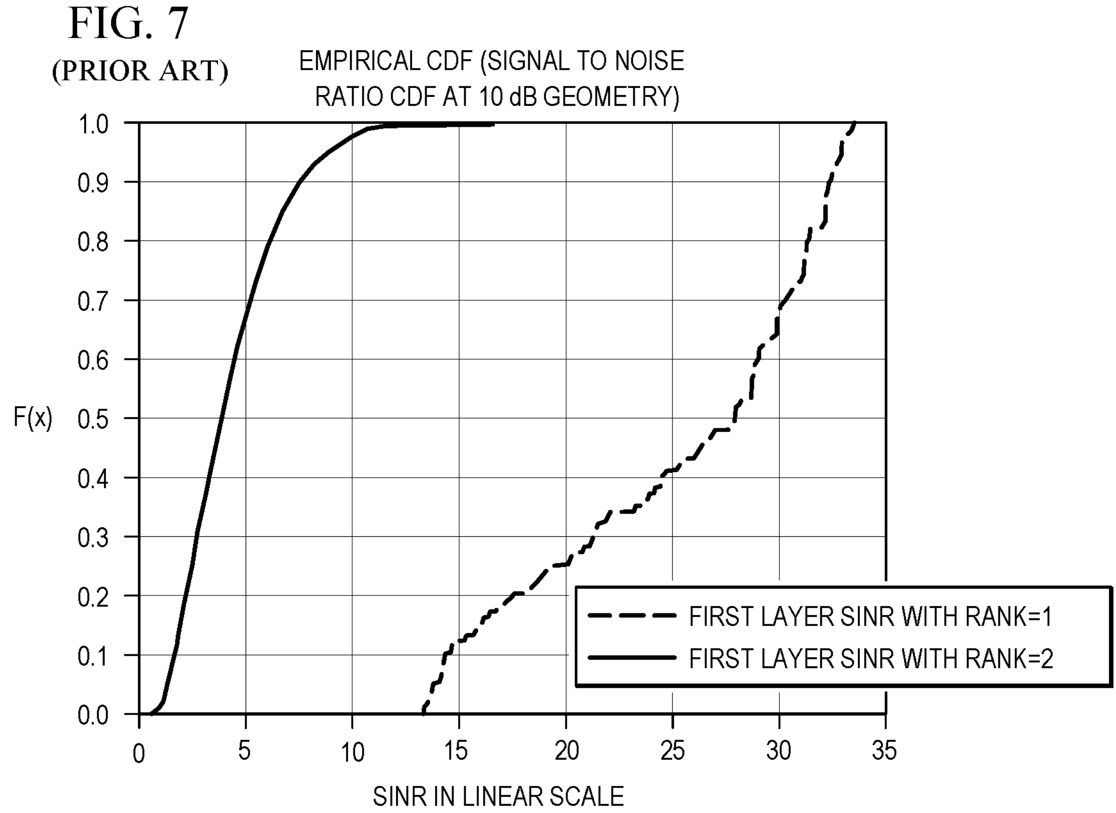
FIG. 7 (PRIOR ART) is a CDF plot for SINR for rank 1 (with the best PMI) and rank 2 (with the best PMI) at 10 dB geometry.
Figure 8:
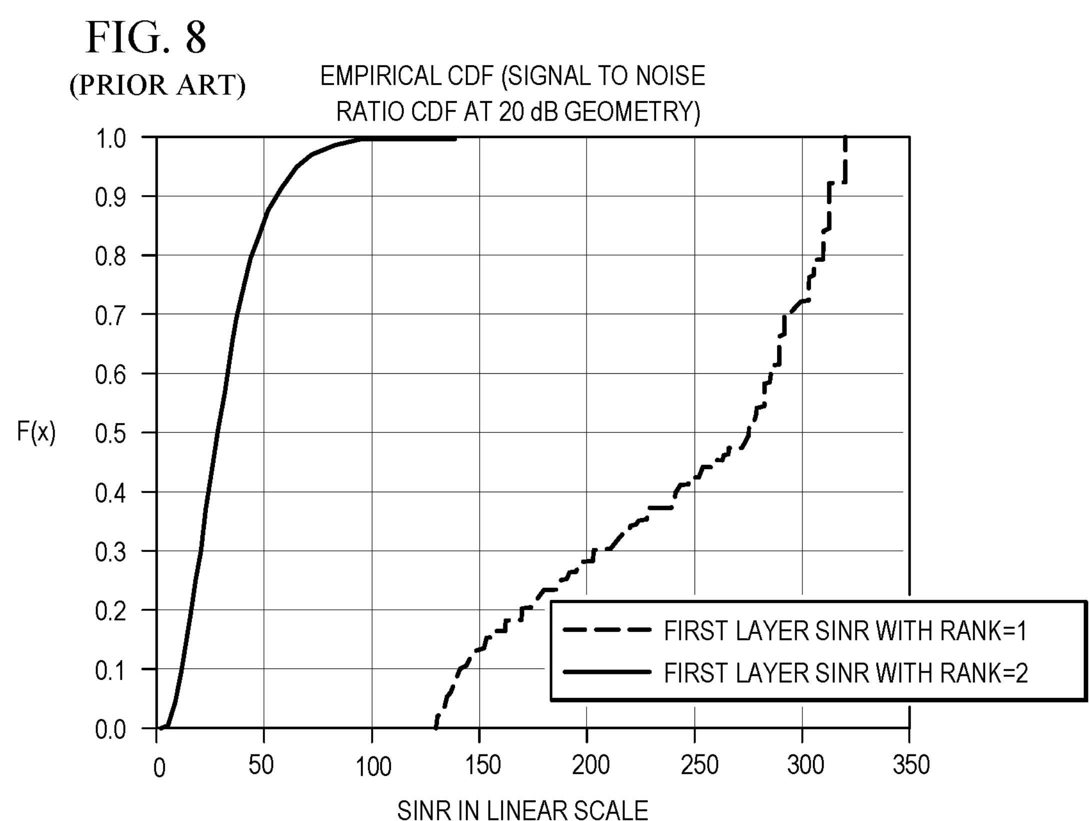
FIG. 8 (PRIOR ART) is a CDF plot for SINR for rank 1 (with the best PMI) and rank 2 (with the best PMI) at 20 dB geometry.

For example, FIGS. 6, 7, and 8 (PRIOR ART) are cumulative distribution function (CDF) plots for SINR for rank 1 (single layer transmission with the best PMI) and rank 2 (two layer transmission with the best PMI) at 0 dB geometry (FIG. 6), 10 dB geometry (FIG. 7) and 20 dB geometry (FIG. 8). In all these cases, it was observed that rank 1 SINR is greater than any layer SINR if rank equals to 2. Note: only the first layer SINR is shown however it was observed that even though the instantaneous SINR of the second layer is different compared to the first layer, the second layer CDF overlaps with the first layer.

Figure 9:
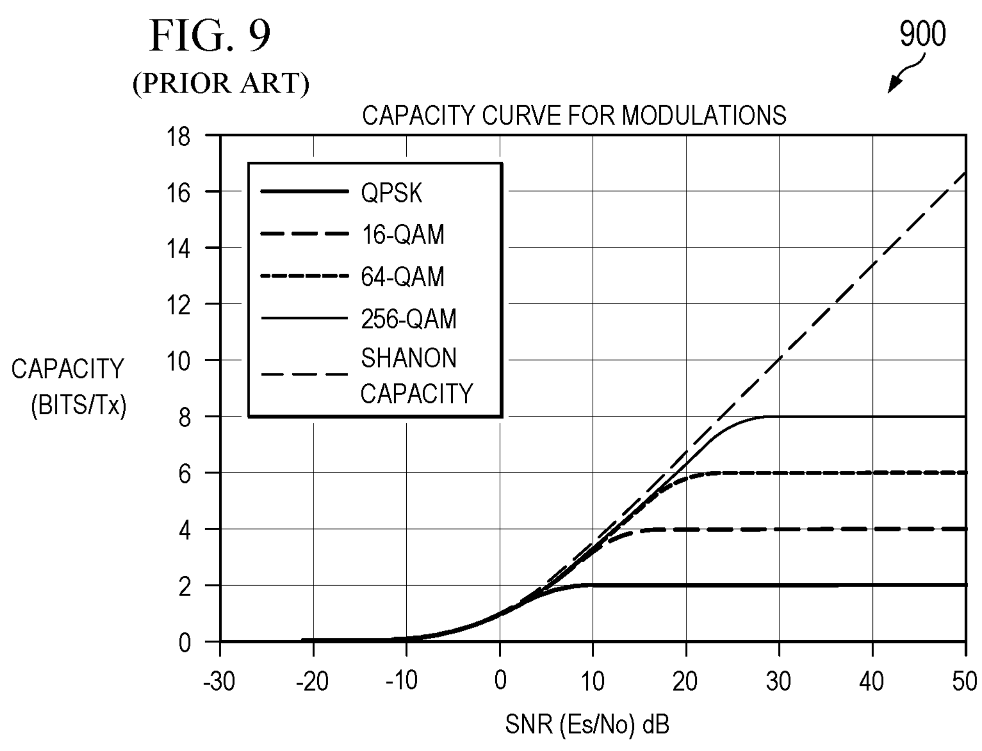
FIG. 9 (PRIOR ART) is a graph illustrating a capacity curve for different modulations.

FIG. 9 (PRIOR ART) is a graph 900 which shows the capacity curve for different modulations including QPSK, 16-QAM, 64-QAM, and 256-QAM. It was observed that the probability of occurrence of 64-QAM, 256-QAM occurs at only high SNR (per layer).

Observation II: Higher Order Modulations are Preferred by the UE at High SNR.

Figure 10:
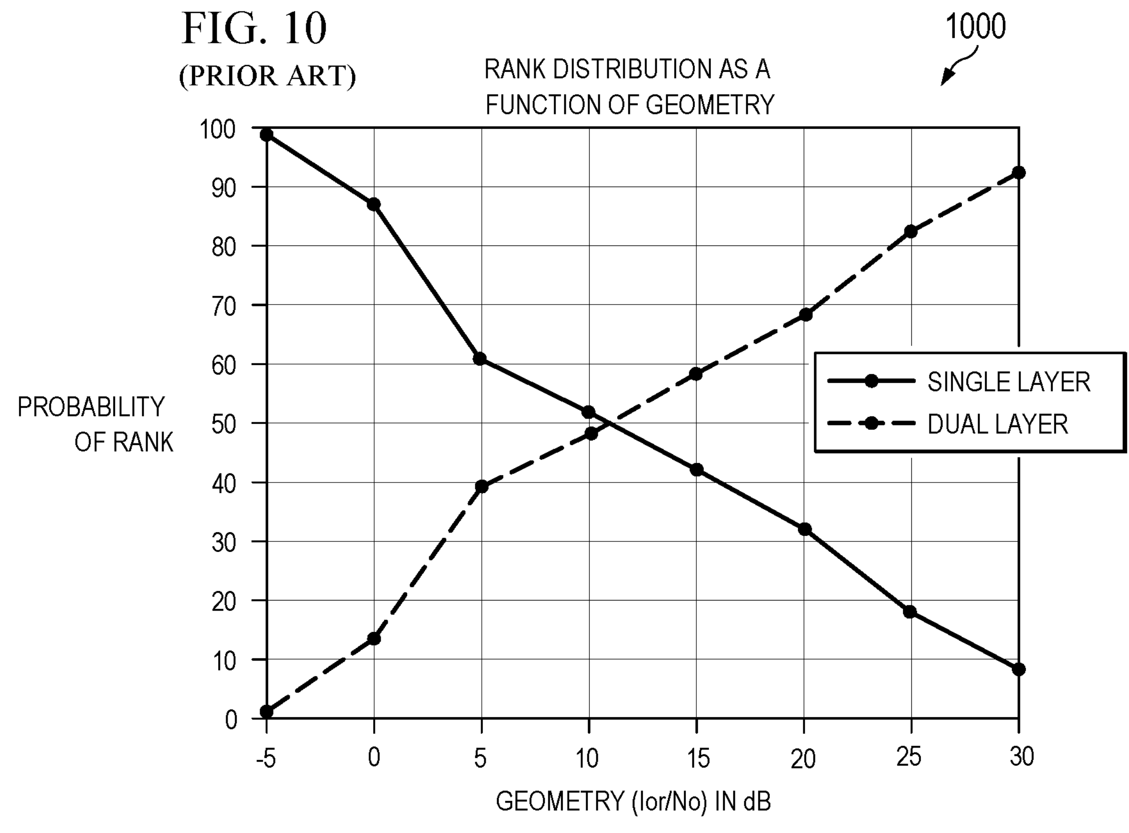
FIG. 10 (PRIOR ART) is a graph illustrating the probability distribution for transmission rank of a 2×2 MIMO system.

FIG. 10 (PRIOR ART) is a graph 1000 illustrating the probability distribution for transmission rank of a 2×2 MIMO system. It was observed that at low geometries the probability of rank=1 is high, while at high geometries the probability of rank=1 is not zero. This implies that there is a probability that UE reports rank equal to one at high geometries.

Observation III: At High Geometries there are Instances when the UE Reports Rank Equal to 1.

From observations I, II and III, the UE prefers a 256-QAM/64-QAM at high geometries when the transmission rank is equal to one. To avoid this problem, the network node 1102 (gNode B 1102) restricts the rank (UE's CSI report) of the UE 1104 to a higher rank when the UE 1104 has a geometry (or related path loss) that is greater than some pre-defined threshold (note: lower rank means higher modulation, and higher rank means lower modulation. For 2 Tx system, higher rank means rank=2, lower rank means rank=1). Thereby the network node 1102 avoids the problem of scheduling 256-QAM while at the same time does not degrade the performance as the network node 1102 can schedule the UE 1104 with a higher rank with lower modulations (e.g., QPSK or 16-QAM or 64 QAM) on each layer. This will eventually utilize all the power of the network node's power amplifier and no back-off is needed in these cases. Exemplary embodiments on how this unique solution can be implemented are discussed in detail below.

Figure 11:
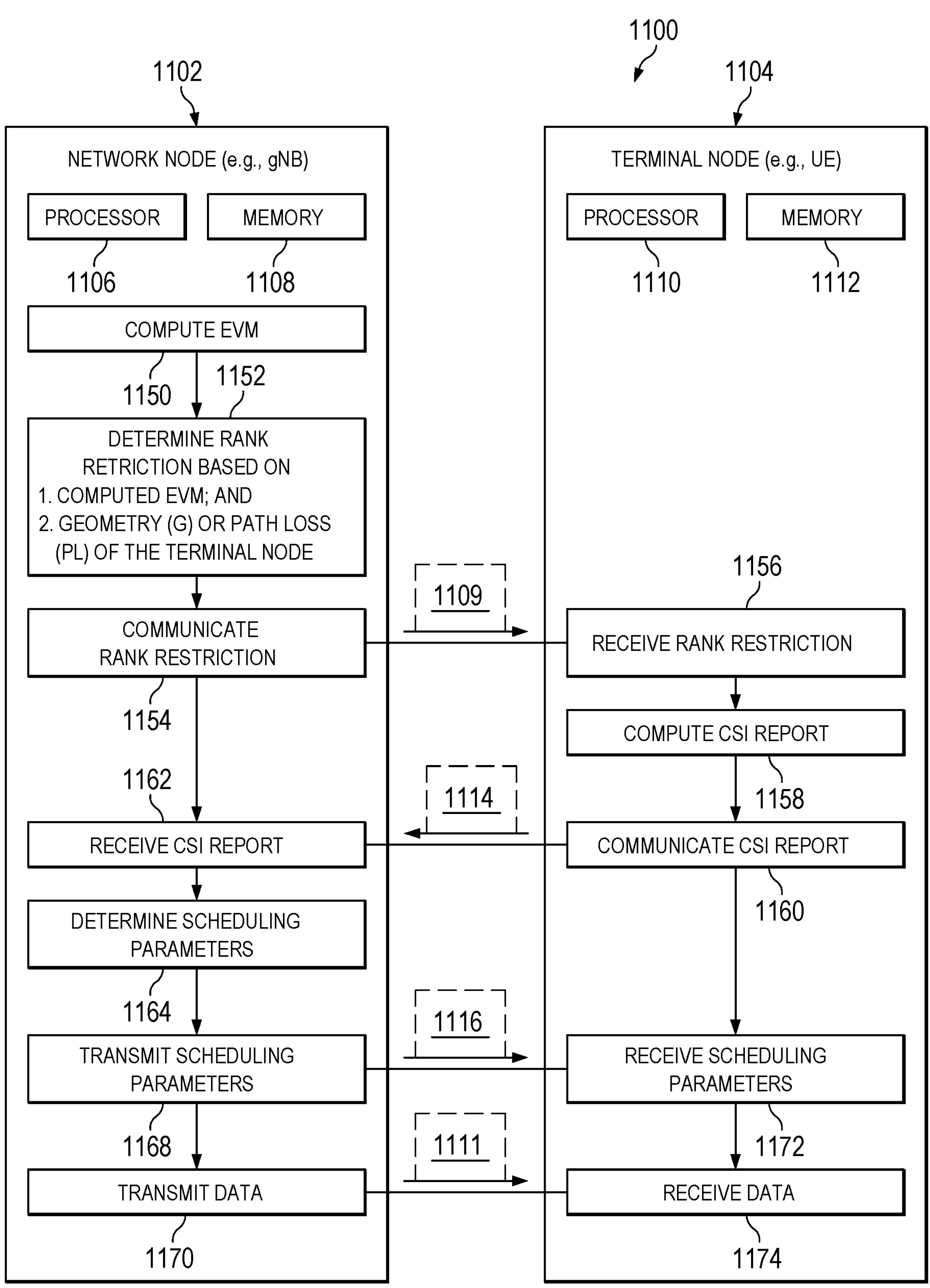
FIG. 11 is a block diagram of a communication system including the network node and the terminal node which are configured to implement operations/steps in accordance with an embodiment of the present disclosure.

Referring to FIG. 11, there is a block diagram of a communication system 1100 including the network node 1102 (e.g., gNB 1102) and the terminal node 1104 (e.g., UE 1104) which are configured to implement operations in accordance with an embodiment of the present disclosure. In this example, the network node 1102 includes a processor 1106 and a memory 1108 that stores processor-executable instructions, where the processor 1106 interfaces with the memory 1108 to execute the processor-executable instructions such that the network node 1102 is operable to: (1) compute the EVM of the network node 1102 (step 1150): (2) determine the rank restriction (if any) for the terminal node 1104 based on (i) the computed EVM (which is compared to required EVM—e.g., TABLE 1) and (ii) the geometry or path loss of the terminal node 1104 (step 1152—see also FIGS. 12 and 13), where the determined rank restriction indicates a rank restriction required by the network node 1102 for transmitting data 1111 to the terminal node 1104; and (3) communicate rank restriction information 1109 which is based on the determined rank restriction (if any) to the terminal node 1104 (step 1154). Then, the terminal node 1104 which includes a processor 1110 and a memory 1112 that stores processor-executable instructions, where the processor 1110 interfaces with the memory 1112 to execute the processor-executable instructions such that the terminal node 1104 is operable to: (1) receive the rank restriction information 1109 which indicates the rank restriction required by the network node 1102 for transmitting data 1111 (radio signals 1111) to the terminal node 1104 (step 1156): (2) compute a CSI report 1114 which includes preferred rank information 1115 (based on the rank restriction information 1109) for radio signals 1111 (data 1111) to be transmitted by the network node 1102 (step 1158); and (3) communicate the computed CSI report 1114 (with the preferred rank information 1115) to the network node 1102 (step 1160). The network node 1102 is further configured to: (4) receive the CSI report 1114 including the preferred rank information 1115 which is associated with the rank restriction information 1109 (step 1162): (5) determine scheduling parameters 1116 for scheduling the terminal node 1104 where the scheduling parameters 1116 are determined using at least the preferred rank information 1115 in the CSI report 1114 (step 1164): (6) transmit the scheduling parameters 1116 on a downlink control channel to the terminal node 1104 (step 1168); and (7) transmit the data 1111 based on the scheduling parameters 1116 to the terminal node 1104 (step 1170). The terminal node 1104 is further configured to: (4) receive the scheduling parameters 1116 (step 1172); and (5) receive the data 1111 (step 1174). As will be discussed in more detail below, the network node 1102 by sending the rank restriction information 1109 to the terminal node 1104 effectively enables the EVM requirements (TABLE 1) to be met while at the same time avoid the power back-off problem by utilizing the complete power of the network node's power amplifier (see FIG. 2).

4.0 Network Node 1102 computes EVM (FIG. 11's step 1150)

The transmitting network node 1102 first computes the EVM of the transmission chain (before the antenna port) and then decides the rank restriction (if any) (steps 1150 and 1152). There are many techniques that can be used to estimate the EVM at the transmission node (step 1150). In the discussion below two techniques are described on how the network node 1102 can compute the EVM (step 1150). It should be appreciated that other techniques of measuring the EVM would work as well with the present solution.

4.1 Measuring the EVM at the Network Node's Transmitter

EVM represents the impairments due to the RF front end of the network node 1102, so it is possible that the network node 1102 can measure the EVM at the output of the transmitter RF front end. For example, in this embodiment the EVM of the RF signal can be measured at the output of the transmitter RF front end by some additional circuitry/algorithm and by measuring the error in the signal constellation.

Figure 2:
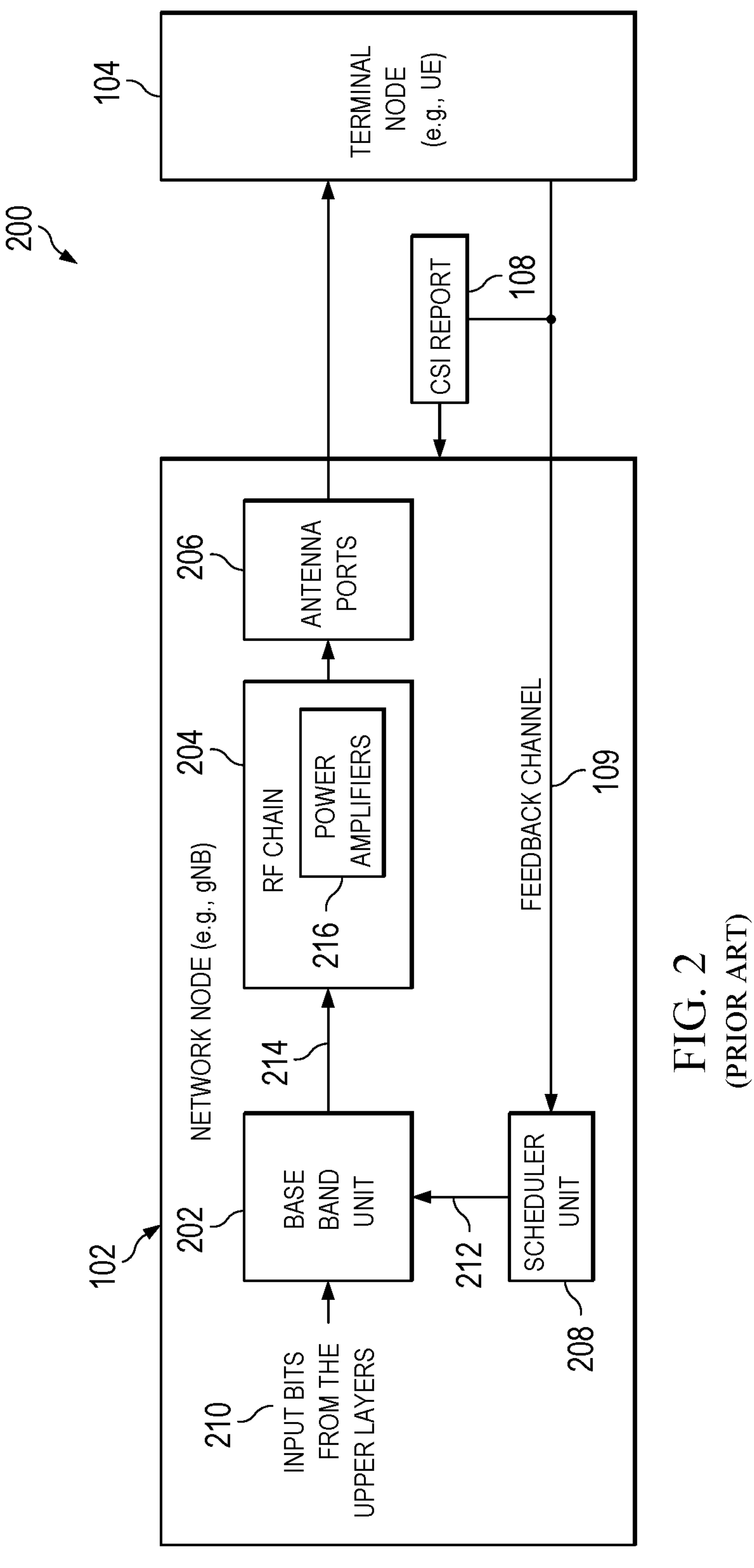
FIG. 2 (PRIOR ART) illustrates a general block diagram of a conventional adaptive communication system including the network node (e.g., gNB) and the terminal node (e.g., UE)
Figure 3:
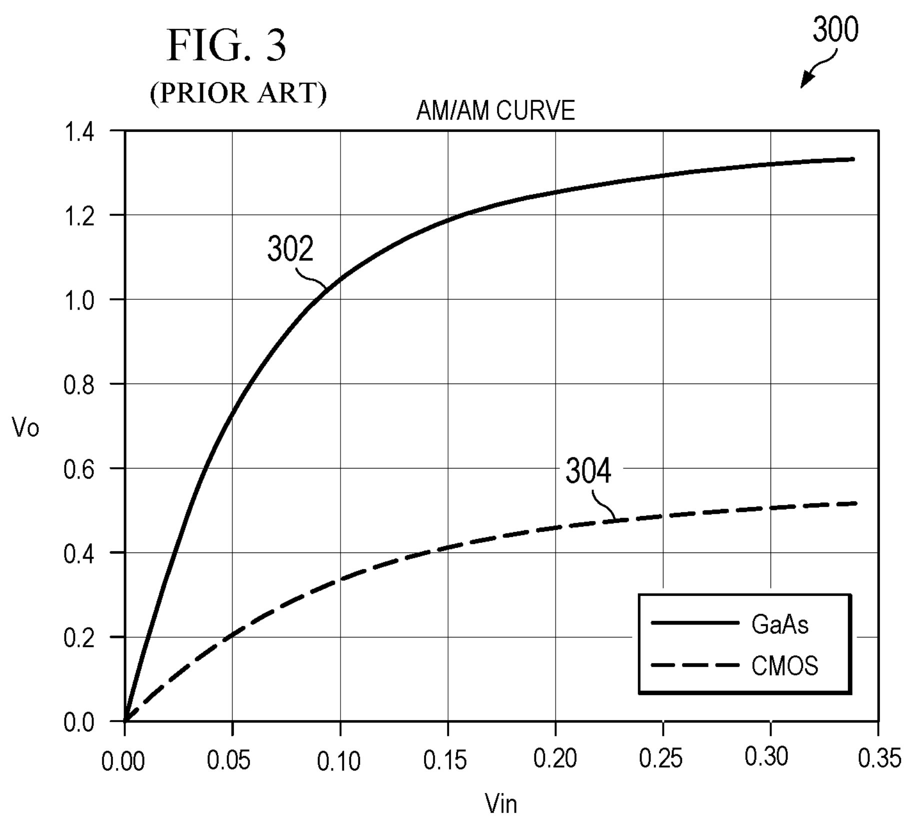
FIG. 3 (PRIOR ART) illustrates a graph of typical AM/AM curves for GaAs and CMOs types of power amplifiers.
Figure 4:
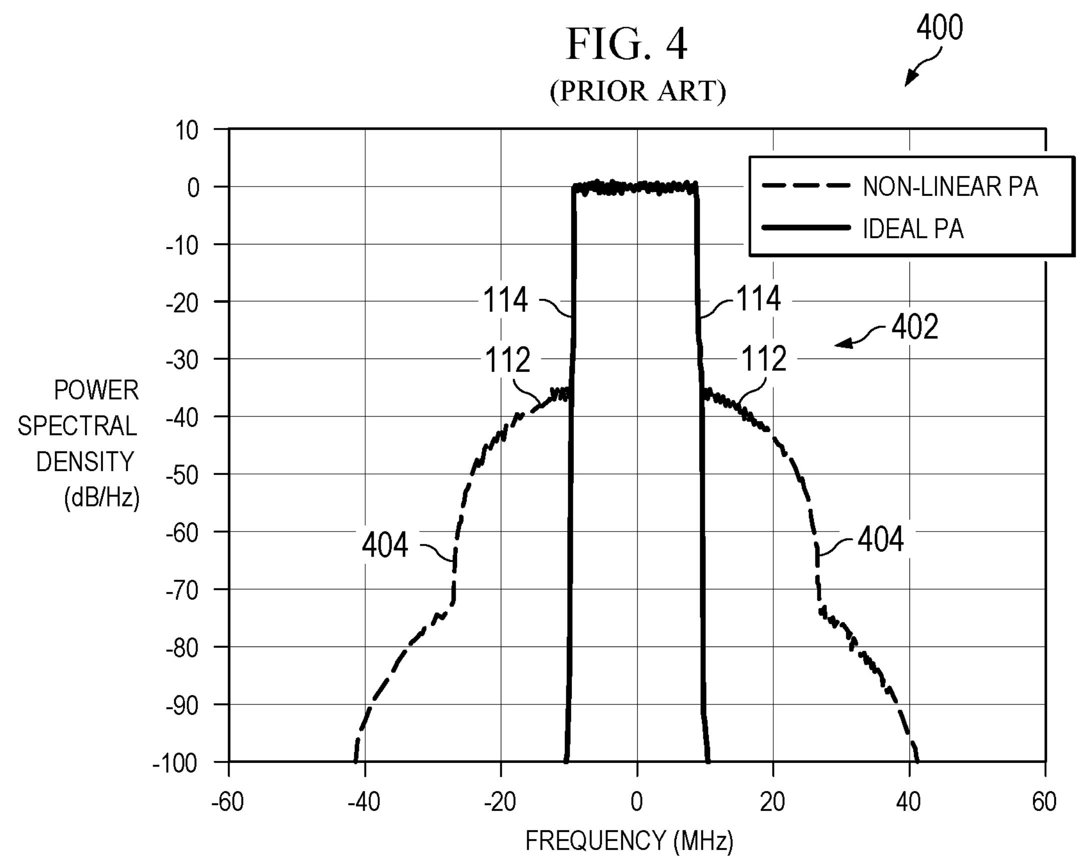
FIG. 4 (PRIOR ART) is a graph that illustrates the spectral re-growth due to realistic power amplifier non-linearity.
Figure 5:
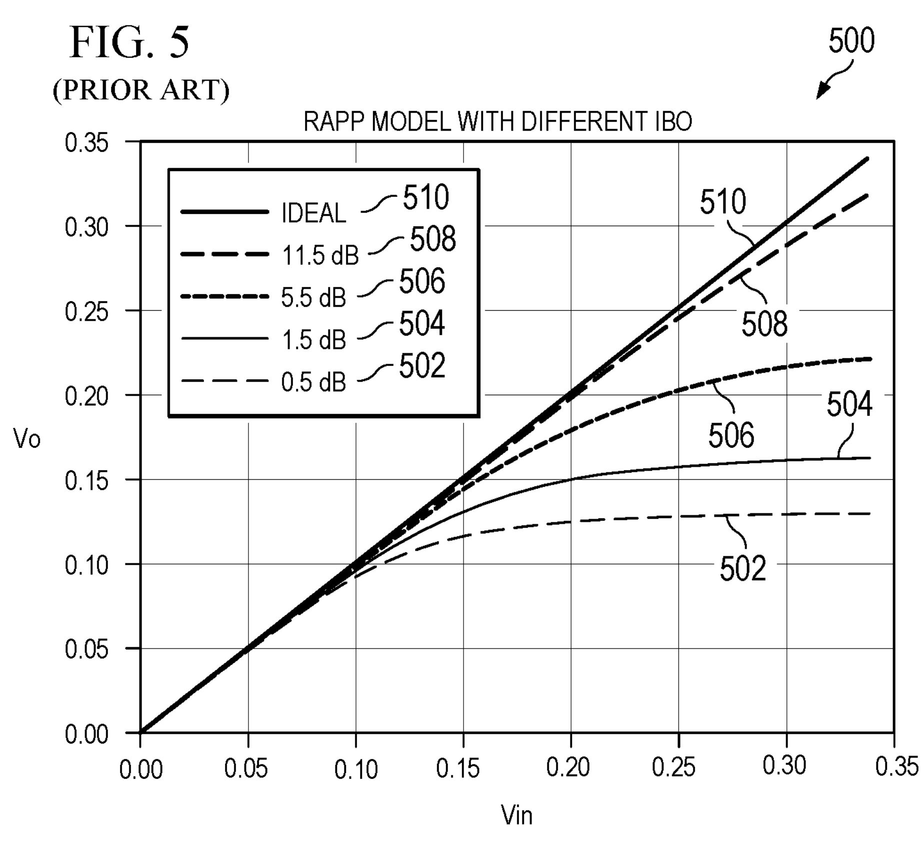
FIG. 5 (PRIOR ART) illustrates a graph which shows the AM/AM characteristics of the power amplifier with different power back-offs.

Alternatively, the network node 1102 can measure the EVM based on a measurement of the baseband signal and calculating the EVM at the output of the RF chain using a model of the RF chain. Note: FIG. 2 shows the basic components of a network node such as the baseband unit, RF chain, antenna ports etc. . . . which are also utilized in the specially configured network node 1102.

In another embodiment, the network node 1102 can obtain the EVM information from its product specification, i.e., the EVM value that was disclosed by the vendor with some error margin, i.e., EVM+$\Delta_{EVM}$, where $\Delta_{EVM}$ is the margin in EVM (%) considered for the network node 1102. This EVM value can be stored in the network node 1102 and retrieved by the network node 1102 from its memory 1108 when required.

In yet another embodiment, the network node 1102 may determine the current or average value of the EVM experienced by the network node 1102. For example, the network node 1102 can do this by measuring the EVM for signals transmitted e.g., on one or more subframes or slots.

4.2 Estimate EVM Based on ACLR Measurements

EVM and adjacent channel leakage ratio (ACLR) are both products of RF impairments, the EVM being the in-band intermodulation and the ACLR being the out-of-band intermodulation. Therefore, it is possible to estimate EVM from ACLR and vice versa. ACLR is measured at the network node 1102, e.g., by using additional circuitry or a spectrometer, and is used as a metric for measuring the out of band emissions.

Alternatively, the ACLR can be determined based on the product declaration of the network node 1102, where ACLR performance value is declared. In this case, the ACLR value can be stored in the network node's memory 1108 and retrieved from the network node's memory 1108 when required.

In yet another embodiment, the network node 1102 may determine the current or average value of ACLR which the network node 1102 experienced. The network node 1102 can do this by measuring the ACLR for signals transmitted e.g., averaged over one or more subframes or slots.

According to another embodiment, the network node 1102 estimates the EVM from the ACLR using a fixed mapping stored in the network node 1102. The mapping can be e.g., in the form of a lookup table, etc. . . . .

5.0 Network Node 1102 Determines Rank Restriction (if any) for Terminal Node 1104 (FIG. 11's Step 1152)

Once the EVM value is computed (step 1150), the transmitting network node 1102 decides whether rank is or is not restricted for the terminal node 1104 based on the computed EVM (which is compared to required EVM—e.g., TABLE 1) and the geometry or path loss of the terminal node 1104 (step 1152). Two examples of how FIG. 11's step 1152 can be implemented are discussed next with respect to FIGS. 12-13.

Figure 12:
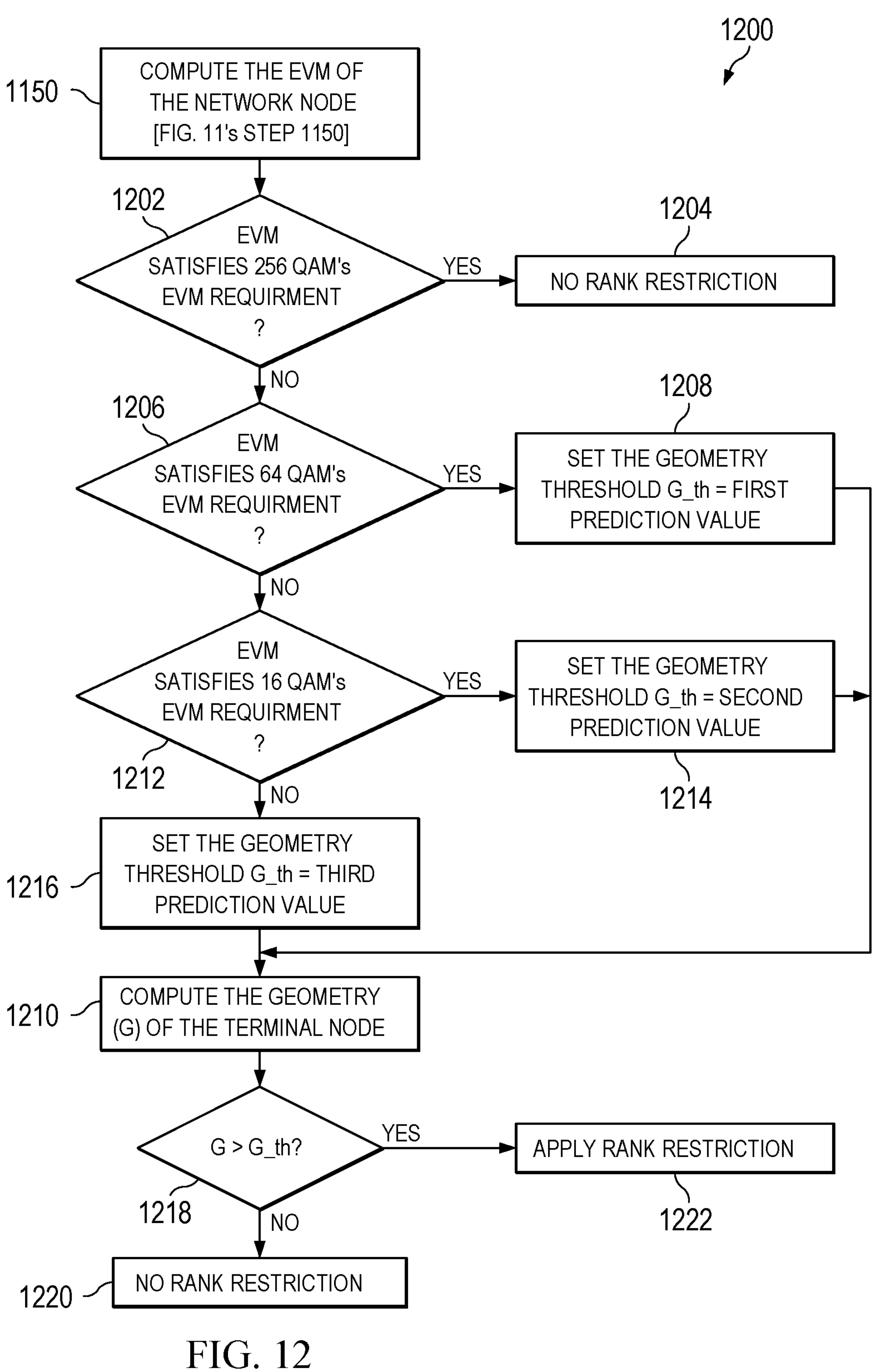
FIG. 12 is a flowchart of a method for one exemplary way that the network node can use geometry to determine rank restrictions (FIG. 11's step 1152) for the terminal node in accordance with an embodiment of the present disclosure.

Referring to FIG. 12, there is a flowchart of a method 1200 for one exemplary way that the network node 1102 can perform FIG. 11's step 1152 in accordance with an embodiment of the present disclosure. Once, the network node 1102 computes the EVM as discussed in FIG. 11's step 1150 then at step 1202 the network node 1102 determines whether the computed EVM satisfies (less than or equal to) the standardized EVM requirement for 256 QAM which e.g., per TABLE 1 is 3.5% EVM. Based on the determination that the computed EVM satisfies (less than or equal to) the 256 QAM's 3.5% EVM at step 1202, then all of the standardized EVM requirements for all of the modulation schemes including 256 QAM, 64 QAM, 16 QAM, and QPSK are satisfied, and the network node 1102 at step 1204 does not need to apply rank restriction.

Based on the determination that the computed EVM does not satisfy (is greater) than 256QAM's 3.5% EVM at step 1202 then the network node 1102 at step 1206 determines whether the computed EVM satisfies (less than or equal to) the standardized EVM requirement for 64 QAM which e.g., per TABLE 1 is 8% EVM. Based on the determination that the computed EVM satisfies (less than or equal to) the 64 QAM's 8% EVM at step 1206, then the network node 1102 at step 1208 sets the geometry threshold G_th to a first predetermined value (e.g., exemplary first predetermined value=23 dB) and proceeds to step 1210 which is discussed below.

Based on the determination that the computed EVM does not satisfy (greater) than 64 QAM's 8% EVM at step 1206, then the network node 1102 at step 1212 determines whether the computed EVM satisfies (less than or equal to) the standardized EVM requirement for 16 QAM which e.g., per TABLE 1 is 12.5% EVM. Based on the determination that the computed EVM satisfies (less than or equal to) the 16 QAM's 12.5% EVM at step 1212, then the network node 1102 at step 1214 sets the geometry threshold G_th to a second predetermined value (e.g., exemplary second predetermined value=14 dB) and proceeds to step 1210 which is discussed below. Based on the determination that the computed EVM does not satisfy (greater) the 16 QAM's 12.5% EVM at step 1212, then the network node 1102 at step 1216 sets the geometry threshold G_th to a third predetermined value (e.g., exemplary third predetermined value=6 dB) and proceeds to step 1210 which is discussed below.

At step 1210, the network node 1102 computes the geometry G of the terminal node 1104. For example, the network node 1102 can average over time received CQI or CSI reports 1114 to estimate the geometry G of the terminal node 1104. It should be appreciated that other techniques of computing the geometry G of the terminal node 1104 would work as well with the present solution.

At step 1218, the network node 1102 determines whether the computed geometry G of the terminal node 1104 is greater than the specific predetermined geometry threshold G_th determined in step 1208 (G_th=23 dB), step 1214 (G_th=14 dB), or step 1216 (G_th=6 dB). If the result of step 1218 is no, then the network node 1102 at step 1220 does not apply rank restriction to the terminal node 1104. If the result of step 1218 is yes, then the network node 1102 at step 1222 applies rank restriction to the terminal node 1104. After step 1222, the network node 1102 communicates the rank restriction information 1109 to the terminal node 1104 as discussed above with respect to FIG. 11's step 1154 and then the network node 1102 continues to perform FIG. 11's steps 1162, 1164, 1168, and 1170.

In the discussion above, the network node 1102 used G_th and the geometry G of the terminal node 1104 when determining the rank restriction (if any) for the terminal node 1104. In the wireless telecommunications field, geometry can be defined as: the long term SINR of the terminal node 1104.

Figure 13:
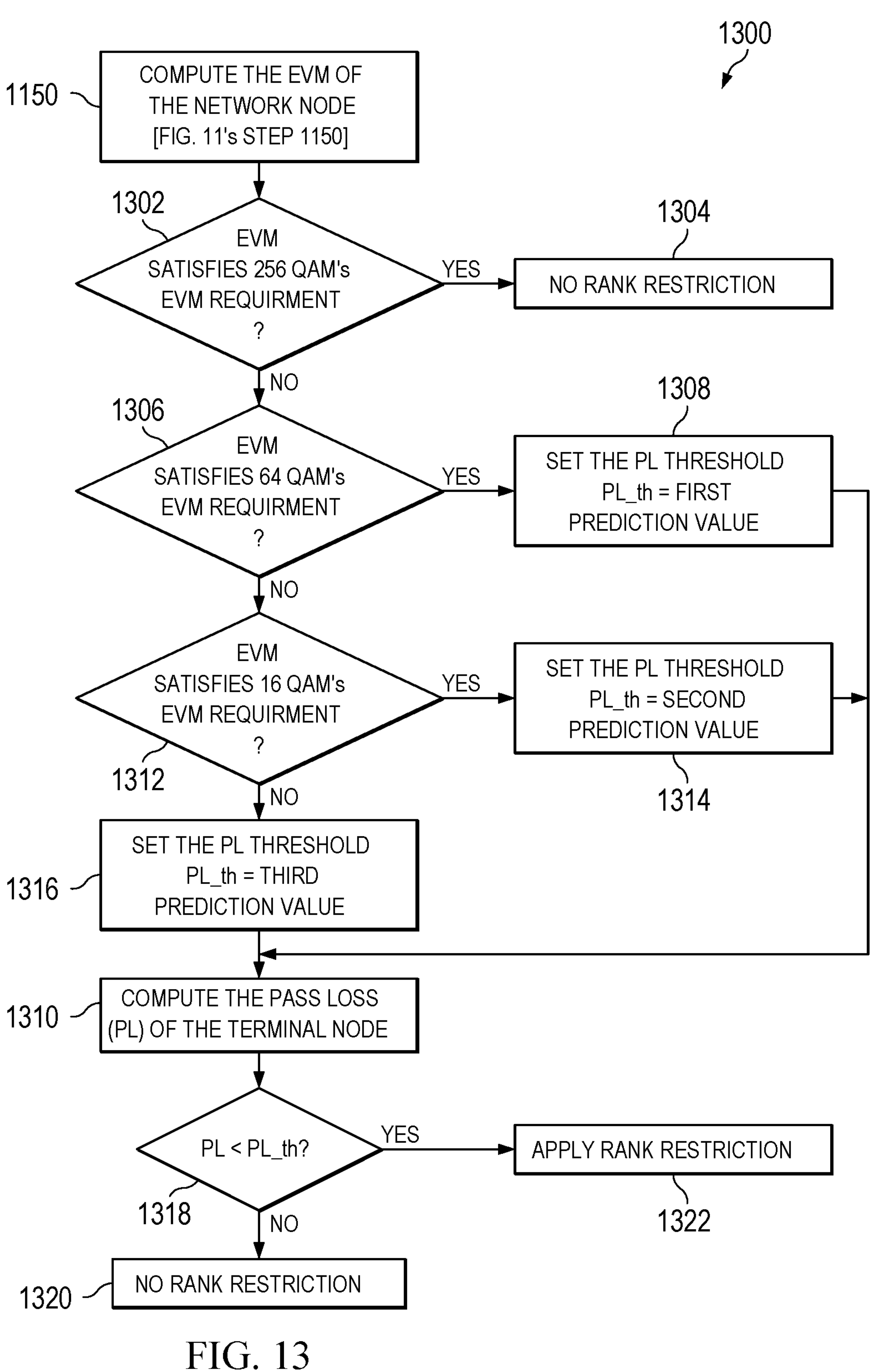
FIG. 13 is a flowchart of a method for one exemplary way that the network node can use path loss to determine rank restrictions (FIG. 11's step 1152) for the terminal node in accordance with an embodiment of the present disclosure.

In an alternative embodiment, the network node 1104 can use a path loss threshold (PL_th) and path loss (PL) of the terminal node 1104 when determining the rank restriction (if any) for the terminal node 1104 (e.g., see FIG. 13). Path Loss is defined as: the ratio of received signal power at the terminal node 1104 to the transmitted power at the network node 1102.

Referring to FIG. 13, there is a flowchart of a method 1300 for another exemplary way that the network node 1102 can perform FIG. 11's step 1152 in accordance with an embodiment of the present disclosure. Once, the network node 1102 computes the EVM as discussed in FIG. 11's step 1150 then at step 1302 the network node 1102 determines whether the computed EVM satisfies (less than or equal to) the standardized EVM requirement for 256 QAM which e.g., per TABLE 1 is 3.5% EVM. Based on the determination that the computed EVM satisfies (less than or equal to) the 256 QAM's 3.5% EVM at step 1302, then all of the standardized EVM requirements for all of the modulation schemes including 256 QAM, 64 QAM, 16 QAM, and QPSK are satisfied, and the network node 1102 at step 1304 does not need to apply rank restriction.

Based on the determination that the computed EVM does not satisfy (is greater) than 256QAM's 3.5% EVM at step 1302 then the network node 1102 at step 1306 determines whether the computed EVM satisfies (less than or equal to) the standardized EVM requirement for 64 QAM which e.g., per TABLE 1 is 8% EVM. Based on the determination that the computed EVM satisfies (less than or equal to) the 64 QAM's 8% EVM at step 1306, then the network node 1102 at step 1308 sets the path loss threshold PL_th to a first predetermined value (e.g., exemplary first predetermined value=−23 dB) and proceeds to step 1310 which is discussed below.

Based on the determination that the computed EVM does not satisfy (greater) than 64 QAM's 8% EVM at step 1306 then the network node 1102 at step 1312 determines whether the computed EVM satisfies (less than or equal to) the standardized EVM requirement for 16 QAM which e.g., per TABLE 1 is 12.5% EVM. Based on the determination that the computed EVM satisfies (less than or equal to) the 16 QAM's 12.5% EVM at step 1312, then the network node 1102 at step 1314 sets the path loss threshold PL_th to a second predetermined value (e.g., exemplary second predetermined value=−14 dB) and proceeds to step 1310 which is discussed below. Based on the determination that the computed EVM does not satisfy (greater) the 16 QAM's 12.5% EVM at step 1312, then the network node 1102 at step 1316 sets the path loss threshold PL_th to a third predetermined value (e.g., exemplary third predetermined value=−6 dB) and proceeds to step 1310 which is discussed below.

At step 1310, the network node 1102 computes the path loss PL of the terminal node 1104. For example, the network node 1102 can estimate the path loss PL of the terminal node 1104 by computing the geometry of the terminal node 1104 which is done by averaging over time multiple received CQI or CSI reports 1114, and then calculating the path loss PL of the terminal node which is equal to 1/geometry. It should be appreciated that other techniques of computing the path loss PL of the terminal node 1104 would work as well with the present solution.

At step 1318, the network node 1102 determines whether the computed path loss PL of the terminal node 1104 is less than the specific predetermined path loss threshold PL_th determined in step 1308 (PL_th=−23 dB), step 1314 (PL_th=−14 dB), or step 1316 (PL_th=−6 dB). If the result of step 1318 is no, then the network node 1102 at step 1320 does not apply rank restriction to the terminal node 1104. If the result of step 1318 is yes, then the network node 1102 at step 1322 applies rank restriction to the terminal node 1104. After step 1322, the network node 1102 communicates the rank restriction information 1109 to the terminal node 1104 as discussed above with respect to FIG. 11's step 1154 and then the network node 1102 continues to perform FIG. 11's steps 1162, 1164, 1168, and 1170.

6.0 Network Node 1102 Communicates Rank Restriction to Terminal Node 1104 (FIG. 11's Step 1154)

There are multiple embodiments on how the network node 1102 can inform the terminal node 1104 about rank restriction. Three exemplary embodiments are discussed next. It should be appreciated that other techniques of communicating the rank restriction information 1109 to the terminal node 1104 would work as well with the present solution.

Embodiment 1: In NR 5G networks, the network node 1102 sends a bit map known as codebook subset restriction for a given antenna configuration (N1 columns and N2 rows) using higher layer signalling. However, per the present solution when a bit is set to zero, then the terminal node 1104 should not use the corresponding entries for PMI/RI computation. Hence as an embodiment of the present solution, the network node 1102 can send a bit map (codebook subset restriction) where all lower ranks are set to zero (e.g., codebook entries corresponding to rank 1 are set to zero). Then, the terminal node 1104 upon receiving the bit map (codebook subset restriction) does not consider a specific rank hypothesis when the corresponding bit is set to zero.

Embodiment 2: Instead of utilizing the codebook subset restriction which occupies a higher payload as in embodiment 1, the network node 1102 can use a rank bit map say r8 . . . r1, and per the present solution set those ranks equal to zero thereby informing the terminal node 1104 not to report any channel state information for the fields which are set to zero. Note that this is different when compared to rank restriction in NR 5G which is a rank limitation rather than rank restriction as discussed in the present solution. Hence a specification needs to be changed in order to implement this particular embodiment.

Embodiment 3: Instead of using the codebook subset restriction or explicit rank restriction of embodiments 1 and 2, the network node 1102 can implicitly inform the terminal node 1104 to not use rank 1 for CSI reporting. For example, the network node 1102 can inform the terminal node 1104 to do this by using previously unused combination of fields in the downlink control channel. It should be appreciated that this is not related to signalling: instead the network node 1102 would use the downlink control channel and in particular the contents of previously unused combination of fields which until the present solution, these unused combinations were not used for any information.

7.0 Terminal Node 1104 Computes CSI Report 1114 (FIG. 11's Step 1158)

The terminal node 1104 upon receiving the rank restriction information 1109 (FIG. 11's step 1154) computes a CSI report 1114 which includes preferred rank information 1115 (based on rank restriction information 1109) for radio signals 1111 (data 1111) to be transmitted by the network node 1102 (FIG. 11's step 1158). In the present solution, the terminal node 1104 can compute the CSI report 1114 in several ways including the following example: choose the best CQI from those ranks as specified by the rank restriction information 1109 received from the network node 1102.

8.0 Exemplary Methods and Structures of Network Node 1102 and Terminal Node 1104

Figure 14:
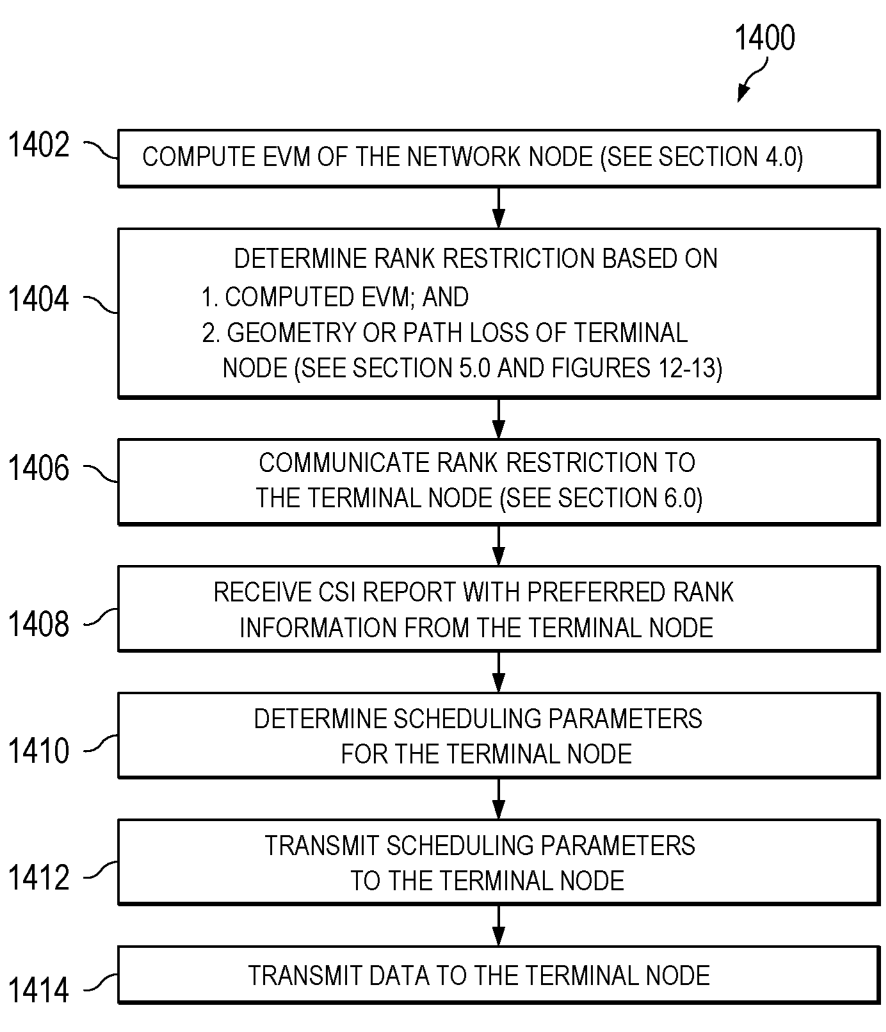
FIG. 14 is a flowchart of a method implemented in the network node in accordance with an embodiment of the present disclosure.

Referring to FIG. 14, there is a flowchart of a method 1400 implemented in the network node 1102 which is configured to interact with the terminal node 1104 in accordance with an embodiment of the present disclosure. At step 1402, the network node 1102 computes the EVM of the network node 1102. At step 1404, the network node 1102 determines the rank restriction (if any) for the terminal node 1104 based on (1) the computed EVM (which is compared to the required EVM—e.g., TABLE 1) and (2) the geometry or path loss of the terminal node 1104 (see also FIGS. 12-13). At step 1406, the network node 1102 communicates the rank restriction information 1109 which is related to the determined rank restriction (if any) to the terminal node 1104. At step 1408, the network node 1102 receives the CSI report 1114 including the preferred rank information 1115 from the terminal node 1104. At step 1410, the network node 1102 determines scheduling parameters 1116 for scheduling the terminal node 1104, where the scheduling parameters 1116 are determined using at least the preferred rank information 1115 in the CSI report 1114. At step 1412, the network node 1102 transmits the scheduling parameters 1116 on a downlink control channel to the terminal node 1104. At step 1414, the network node 1102 transmits the data 1111 based on the scheduling parameters 1116 to the terminal node 1104. The network node 1102 by performing method 1400 and sending the rank restriction information 1109 to the terminal node 1104 effectively enables the EVM requirements (TABLE 1) to be met while at the same time avoid the power back-off problem by utilizing the complete power of the network node's power amplifier.

Figure 15:
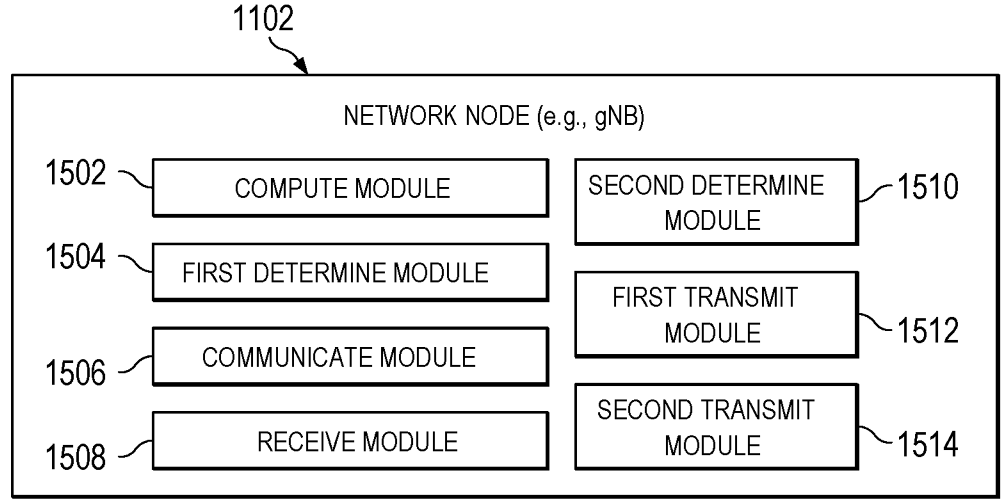
FIG. 15 is a block diagram illustrating a structure of the network node configured in accordance with an embodiment of the present disclosure.

Referring to FIG. 15, there is a block diagram illustrating structures of an exemplary network node 1102 (e.g., gNB 1102) configured in accordance with an embodiment of the present disclosure. The network node 1102 comprises a compute module 1502, a first determine module 1504, a communicate module 1506, a receive module 1508, a second determine module 1510, a first transmit module 1512, and a second transmit module 1514. The compute module 1502 is configured to compute the EVM value of the network node 1102. The first determine module 1504 is configured to determine the rank restriction (if any) for the terminal node 1104 based on (1) the computed EVM (which is compared to required EVM—e.g., TABLE 1) and (2) the geometry or path loss of the terminal node 1104 (see also FIG. 12). The communicate module 1506 is configured to communicate the rank restriction information 1109 related to the determined rank restriction (if any) to the terminal node 1104. The receive module 1508 is configured to receive the CSI report 1114 including the preferred rank information 1115 from the terminal node 1104. The second determine module 1510 is configured to determine scheduling parameters 1116 for scheduling the terminal node 1104, where the scheduling parameters 1116 are determined using at least the CSI report 1114 which includes the preferred rank information 1115. The first transmit module 1512 is configured to transmit the scheduling parameters 1116 on a downlink control channel to the terminal node 1104. The second transmit module 1514 is configured to transmit the data 1111 based on the scheduling parameters 1116 to the terminal node 1104. It should be appreciated that the network node 1102 may also include other components, modules or structures which are well-known, but for clarity, only the components, modules or structures needed to describe the features of the present disclosure are described herein.

As those skilled in the art will appreciate, the above-described modules 1502, 1504, 1506, 1508, 1510, 1512, and 1514 of the network node 1102 may be implemented as suitable dedicated circuit. Further, the modules 1502, 1504, 1506, 1508, 1510, 1512, and 1514 can also be implemented using any number of dedicated circuits through functional combination or separation. In some embodiments, the modules 1502, 1504, 1506, 1508, 1510, 1512, and 1514 may even be combined in a single application specific integrated circuit (ASIC). As an alternative software-based implementation, the network node 1102 may comprise processing circuitry which may comprise a memory 1108, and a processor 1106 (including but not limited to a microprocessor, a microcontroller, or a Digital Signal Processor (DSP), etc.). The memory 1108 stores machine-readable program code executable by the processor 1106 to cause the network node 1102 to perform the steps of the above-described methods associated with FIGS. 11-14.

Figure 16:
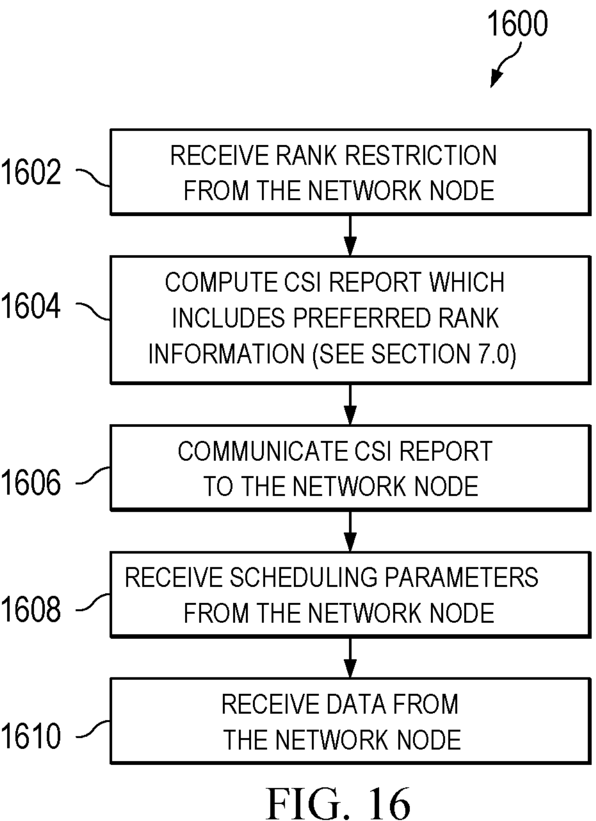
FIG. 16 is a flowchart of a method implemented in the terminal node in accordance with an embodiment of the present disclosure.

Referring to FIG. 16, there is a flowchart of a method 1600 implemented in the terminal node 1104 which is configured to interact with the network node 1102 in accordance with an embodiment of the present disclosure. At step 1602, the terminal node 1104 receives the rank restriction information 1109 which indicates the rank restriction required by the network node 1102 for transmitting data 1111 (radio signals 1111) to the terminal node 1104. At step 1604, the terminal node 1104 computes a CSI report 1114 which includes preferred rank information 1115 (based on rank restriction information 1109) for radio signals 1111 (data 1111) to be transmitted by the network node 1102. At step 1606, the terminal node 1104 communicates the computed CSI report 1114 (with the preferred rank information 1115) to the network node 1102. At step 1608, the terminal node 1104 receives the scheduling parameters 1116 on a downlink control channel from the network node 1102. At step 1610, the terminal node 1104 receives the data 1111 based on the scheduling parameters 1116 received from the network node 1102. The terminal node 1104 by performing method 1600 and computing then sending the CSI report 1114 which includes the preferred rank information 1115 (based on rank restriction information 1109) for data 1111 (radio signals 1111) subsequently transmitted by the network node 1102 to the terminal node 1104 effectively enables the EVM requirements (TABLE 1) to be met while at the same time avoid the power back-off problem by utilizing the complete power of the network node's power amplifier.

Figure 17:
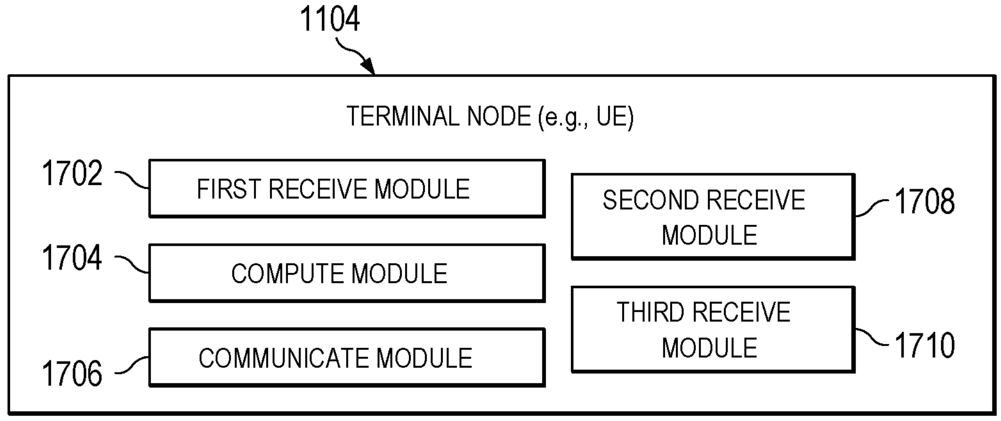
FIG. 17 is a block diagram illustrating a structure of the terminal node configured in accordance with an embodiment of the present disclosure.

Referring to FIG. 17 there is a block diagram illustrating structures of an exemplary terminal node 1104 (e.g., UE 1104) configured in accordance with an embodiment of the present disclosure. The terminal node 1104 comprises a first receive module 1702, a compute module 1704, a communicate module 1706, a second receive module 1708, and a third receive module 1710. The first receive module 1702 is configured to receive the rank restriction information 1109 which indicates the rank restriction required by the network node 1102 for transmitting radio signals 1111 (data 1111) to the terminal node 1104. The compute module 1704 is configured to compute a CSI report 1114 which includes preferred rank information 1115 (based on rank restriction information 1109) for radio signals 1111 (data 1111) to be transmitted by the network node 1102. The communicate module 1706 is configured to communicate the computed CSI report 1114 (with the preferred rank information 1115) to the network node 1102. The second receive module 1708 is configured to receive the scheduling parameters 1116 on a downlink control channel from the network node 1104. The third receive module 1710 is configured to receive the data 1111 based on the scheduling parameters 1116 from the network node 1102. It should be appreciated that the terminal node 1104 may also include other components, modules or structures which are well-known, but for clarity, only the components, modules or structures needed to describe the features of the present disclosure are described herein.

As those skilled in the art will appreciate, the above-described modules 1702, 1704, 1706, 1708, and 1710 of the terminal node 1104 may be implemented as suitable dedicated circuit. Further, the modules 1702, 1704, 1706, 1708, and 1710 can also be implemented using any number of dedicated circuits through functional combination or separation. In some embodiments, the modules 1702, 1704, 1706, 1708, and 1710 may even be combined in a single application specific integrated circuit (ASIC). As an alternative software-based implementation, the terminal node 1104 may comprise processing circuitry which may comprise a memory 1112, and a processor 1110 (including but not limited to a microprocessor, a microcontroller, or a Digital Signal Processor (DSP), etc.). The memory 1112 stores machine-readable program code executable by the processor 1110 to cause the terminal node 1104 to perform the steps of the above-described methods associated with FIGS. 11 and 16.

9.0 Exemplary Advantages of Present Solution

The present solution addresses the problem associated with the prior art by avoiding a power back-off problem with power amplifiers in the network node 1102 while meeting the standardized EVM requirements for the wireless communication system. In addition, the present solution has the following exemplary advantages:

- Facilitate an efficient implementation of 5G NR products without significantly reducing the user throughput, while at the same time meeting the current 3GPP EVM requirements.
- Avoids the unnecessary reduction in power back-off of the network node's power amplifier(s) by utilizing the full amount of power from the power amplifier(s).
- The power consumption at the network node 1102 (e.g., BS 1102) is reduced due to overall reduction in the processing requirements.

10. Additional Explanation

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 18A:
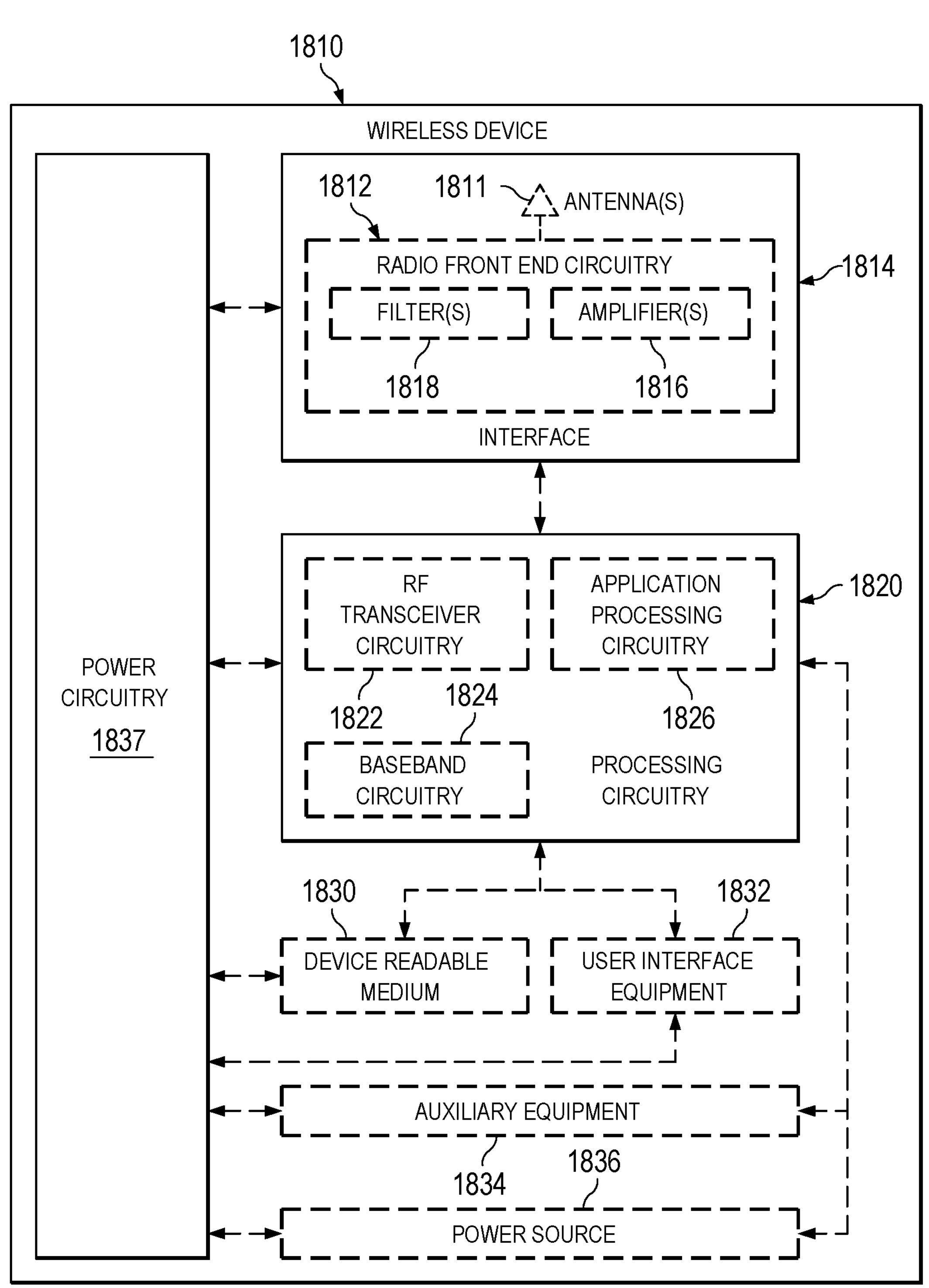
FIGS. 18A-18B is an illustration of a wireless network including a wireless device and network node configured in accordance with an embodiment of the present disclosure.
Figure 18B:
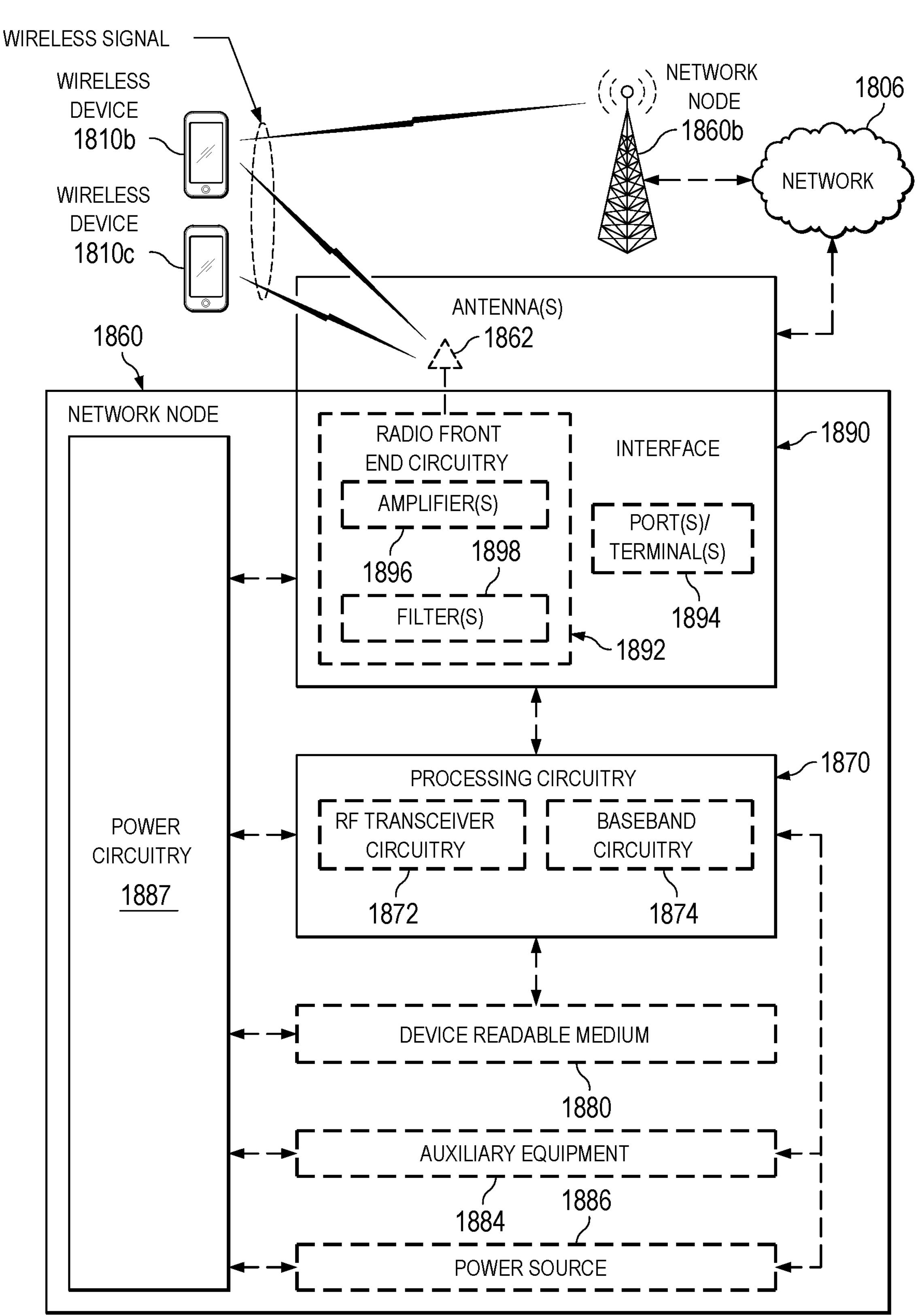

Although the subject matter described herein may be implemented in any appropriate type of system using any suitable components, the embodiments disclosed herein are described in relation to a wireless network, such as the example wireless network illustrated in FIGS. 18A-18B. For simplicity, the wireless network of FIGS. 18A-18B only depicts network 1806, network nodes 1860 and 1860*b*, and WDs 1810, 1810*b*, and 1810*c*. In practice, a wireless network may further include any additional elements suitable to support communication between wireless devices or between a wireless device and another communication device, such as a landline telephone, a service provider, or any other network node or end device. Of the illustrated components, network node 1860 and wireless device (WD) 1810 are depicted with additional detail. The wireless network may provide communication and other types of services to one or more wireless devices to facilitate the wireless devices access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1860 and WD 1810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIGS. 18A-18B, network node 1860 includes processing circuitry 1870, device readable medium 1880, interface 1890, auxiliary equipment 1884, power source 1886, power circuitry 1887, and antenna 1862. Although network node 1860 illustrated in the example wireless network of FIGS. 18A-18B may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1860 are depicted as single boxes located within a larger box, or nested within multiple boxes, in practice, a network node may comprise multiple different physical components that make up a single illustrated component (e.g., device readable medium 1880 may comprise multiple separate hard drives as well as multiple RAM modules).

Similarly, network node 1860 may be composed of multiple physically separate components (e.g., a NodeB component and a RNC component, or a BTS component and a BSC component, etc.), which may each have their own respective components. In certain scenarios in which network node 1860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1860 may be configured to support multiple radio access technologies (RATs). In such embodiments, some components may be duplicated (e.g., separate device readable medium 1880 for the different RATs) and some components may be reused (e.g., the same antenna 1862 may be shared by the RATs). Network node 1860 may also include multiple sets of the various illustrated components for different wireless technologies integrated into network node 1860, such as, for example, GSM, WCDMA, LTE, NR, WiFi, or Bluetooth wireless technologies. These wireless technologies may be integrated into the same or different chip or set of chips and other components within network node 1860.

Processing circuitry 1870 is configured to perform any determining, calculating, or similar operations (e.g., certain obtaining operations) described herein as being provided by a network node. These operations performed by processing circuitry 1870 may include processing information obtained by processing circuitry 1870 by, for example, converting the obtained information into other information, comparing the obtained information or converted information to information stored in the network node, and/or performing one or more operations based on the obtained information or converted information, and as a result of said processing making a determination.

Processing circuitry 1870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1860 components, such as device readable medium 1880, network node 1860 functionality. For example, processing circuitry 1870 may execute instructions stored in device readable medium 1880 or in memory within processing circuitry 1870. Such functionality may include providing any of the various wireless features, functions, or benefits discussed herein. In some embodiments, processing circuitry 1870 may include a system on a chip (SOC).

In some embodiments, processing circuitry 1870 may include one or more of radio frequency (RF) transceiver circuitry 1872 and baseband processing circuitry 1874. In some embodiments, radio frequency (RF) transceiver circuitry 1872 and baseband processing circuitry 1874 may be on separate chips (or sets of chips), boards, or units, such as radio units and digital units. In alternative embodiments, part or all of RF transceiver circuitry 1872 and baseband processing circuitry 1874 may be on the same chip or set of chips, boards, or units In certain embodiments, some or all of the functionality described herein as being provided by a network node, base station, eNB or other such network device may be performed by processing circuitry 1870 executing instructions stored on device readable medium 1880 or memory within processing circuitry 1870. In alternative embodiments, some or all of the functionality may be provided by processing circuitry 1870 without executing instructions stored on a separate or discrete device readable medium, such as in a hard-wired manner. In any of those embodiments, whether executing instructions stored on a device readable storage medium or not, processing circuitry 1870 can be configured to perform the described functionality. The benefits provided by such functionality are not limited to processing circuitry 1870 alone or to other components of network node 1860, but are enjoyed by network node 1860 as a whole, and/or by end users and the wireless network generally.

Device readable medium 1880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1870. Device readable medium 1880 may store any suitable instructions, data or information, including a computer program, software, an application including one or more of logic, rules, code, tables, etc. and/or other instructions capable of being executed by processing circuitry 1870 and, utilized by network node 1860. Device readable medium 1880 may be used to store any calculations made by processing circuitry 1870 and/or any data received via interface 1890. In some embodiments, processing circuitry 1870 and device readable medium 1880 may be considered to be integrated.

Interface 1890 is used in the wired or wireless communication of signalling and/or data between network node 1860, network 1806, and/or WDs 1810. As illustrated, interface 1890 comprises port(s)/terminal(s) 1894 to send and receive data, for example to and from network 1806 over a wired connection. Interface 1890 also includes radio front end circuitry 1892 that may be coupled to, or in certain embodiments a part of, antenna 1862. Radio front end circuitry 1892 comprises filters 1898 and amplifiers 1896. Radio front end circuitry 1892 may be connected to antenna 1862 and processing circuitry 1870. Radio front end circuitry may be configured to condition signals communicated between antenna 1862 and processing circuitry 1870. Radio front end circuitry 1892 may receive digital data that is to be sent out to other network nodes or WDs via a wireless connection. Radio front end circuitry 1892 may convert the digital data into a radio signal having the appropriate channel and bandwidth parameters using a combination of filters 1898 and/or amplifiers 1896. The radio signal may then be transmitted via antenna 1862. Similarly, when receiving data, antenna 1862 may collect radio signals which are then converted into digital data by radio front end circuitry 1892. The digital data may be passed to processing circuitry 1870. In other embodiments, the interface may comprise different components and/or different combinations of components.

In certain alternative embodiments, network node 1860 may not include separate radio front end circuitry 1892, instead, processing circuitry 1870 may comprise radio front end circuitry and may be connected to antenna 1862 without separate radio front end circuitry 1892. Similarly, in some embodiments, all or some of RF transceiver circuitry 1872 may be considered a part of interface 1890. In still other embodiments, interface 1890 may include one or more ports or terminals 1894, radio front end circuitry 1892, and RF transceiver circuitry 1872, as part of a radio unit (not shown), and interface 1890 may communicate with baseband processing circuitry 1874, which is part of a digital unit (not shown).

Antenna 1862 may include one or more antennas, or antenna arrays, configured to send and/or receive wireless signals. Antenna 1862 may be coupled to radio front end circuitry 1890 and may be any type of antenna capable of transmitting and receiving data and/or signals wirelessly. In some embodiments, antenna 1862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1862 may be separate from network node 1860 and may be connectable to network node 1860 through an interface or port.

Antenna 1862, interface 1890, and/or processing circuitry 1870 may be configured to perform any receiving operations and/or certain obtaining operations described herein as being performed by a network node. Any information, data and/or signals may be received from a wireless device, another network node and/or any other network equipment. Similarly, antenna 1862, interface 1890, and/or processing circuitry 1870 may be configured to perform any transmitting operations described herein as being performed by a network node. Any information, data and/or signals may be transmitted to a wireless device, another network node and/or any other network equipment.

Power circuitry 1887 may comprise, or be coupled to, power management circuitry and is configured to supply the components of network node 1860 with power for performing the functionality described herein. Power circuitry 1887 may receive power from power source 1886. Power source 1886 and/or power circuitry 1887 may be configured to provide power to the various components of network node 1860 in a form suitable for the respective components (e.g., at a voltage and current level needed for each respective component). Power source 1886 may either be included in, or external to, power circuitry 1887 and/or network node 1860. For example, network node 1860 may be connectable to an external power source (e.g., an electricity outlet) via an input circuitry or interface such as an electrical cable, whereby the external power source supplies power to power circuitry 1887. As a further example, power source 1886 may comprise a source of power in the form of a battery or battery pack which is connected to, or integrated in, power circuitry 1887. The battery may provide backup power should the external power source fail. Other types of power sources, such as photovoltaic devices, may also be used.

Alternative embodiments of network node 1860 may include additional components beyond those shown in FIGS. 18A-18B that may be responsible for providing certain aspects of the network node's functionality, including any of the functionality described herein and/or any functionality necessary to support the subject matter described herein. For example, network node 1860 may include user interface equipment to allow input of information into network node 1860 and to allow output of information from network node 1860. This may allow a user to perform diagnostic, maintenance, repair, and other administrative functions for network node 1860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1810 includes antenna 1811, interface 1814, processing circuitry 1820, device readable medium 1830, user interface equipment 1832, auxiliary equipment 1834, power source 1836 and power circuitry 1837. WD 1810 may include multiple sets of one or more of the illustrated components for different wireless technologies supported by WD 1810, such as, for example, GSM, WCDMA, LTE, NR, WiFi, WiMAX, or Bluetooth wireless technologies, just to mention a few. These wireless technologies may be integrated into the same or different chips or set of chips as other components within WD 1810.

Antenna 1811 may include one or more antennas or antenna arrays, configured to send and/or receive wireless signals, and is connected to interface 1814. In certain alternative embodiments, antenna 1811 may be separate from WD 1810 and be connectable to WD 1810 through an interface or port. Antenna 1811, interface 1814, and/or processing circuitry 1820 may be configured to perform any receiving or transmitting operations described herein as being performed by a WD. Any information, data and/or signals may be received from a network node and/or another WD. In some embodiments, radio front end circuitry and/or antenna 1811 may be considered an interface.

As illustrated, interface 1814 comprises radio front end circuitry 1812 and antenna 1811. Radio front end circuitry 1812 comprise one or more filters 1818 and amplifiers 1816. Radio front end circuitry 1814 is connected to antenna 1811 and processing circuitry 1820 and is configured to condition signals communicated between antenna 1811 and processing circuitry 1820. Radio front end circuitry 1812 may be coupled to or a part of antenna 1811. In some embodiments, WD 1810 may not include separate radio front end circuitry 1812: rather, processing circuitry 1820 may comprise radio front end circuitry and may be connected to antenna 1811. Similarly, in some embodiments, some or all of RF transceiver circuitry 1822 may be considered a part of interface 1814. Radio front end circuitry 1812 may receive digital data that is to be sent out to other network nodes or WDs via a wireless connection. Radio front end circuitry 1812 may convert the digital data into a radio signal having the appropriate channel and bandwidth parameters using a combination of filters 1818 and/or amplifiers 1816. The radio signal may then be transmitted via antenna 1811. Similarly, when receiving data, antenna 1811 may collect radio signals which are then converted into digital data by radio front end circuitry 1812. The digital data may be passed to processing circuitry 1820. In other embodiments, the interface may comprise different components and/or different combinations of components.

Processing circuitry 1820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1810 components, such as device readable medium 1880, WD 1810 functionality. Such functionality may include providing any of the various wireless features or benefits discussed herein. For example, processing circuitry 1820 may execute instructions stored in device readable medium 1880 or in memory within processing circuitry 1820 to provide the functionality disclosed herein.

As illustrated, processing circuitry 1820 includes one or more of RF transceiver circuitry 1822, baseband processing circuitry 1824, and application processing circuitry 1826. In other embodiments, the processing circuitry may comprise different components and/or different combinations of components. In certain embodiments processing circuitry 1820 of WD 1810 may comprise a SOC. In some embodiments, RF transceiver circuitry 1822, baseband processing circuitry 1824, and application processing circuitry 1826 may be on separate chips or sets of chips. In alternative embodiments, part or all of baseband processing circuitry 1824 and application processing circuitry 1826 may be combined into one chip or set of chips, and RF transceiver circuitry 1822 may be on a separate chip or set of chips. In still alternative embodiments, part or all of RF transceiver circuitry 1822 and baseband processing circuitry 1824 may be on the same chip or set of chips, and application processing circuitry 1826 may be on a separate chip or set of chips. In yet other alternative embodiments, part or all of RF transceiver circuitry 1822, baseband processing circuitry 1824, and application processing circuitry 1826 may be combined in the same chip or set of chips. In some embodiments, RF transceiver circuitry 1822 may be a part of interface 1814. RF transceiver circuitry 1822 may condition RF signals for processing circuitry 1820.

In certain embodiments, some or all of the functionality described herein as being performed by a WD may be provided by processing circuitry 1820 executing instructions stored on device readable medium 1880, which in certain embodiments may be a computer-readable storage medium. In alternative embodiments, some or all of the functionality may be provided by processing circuitry 1820 without executing instructions stored on a separate or discrete device readable storage medium, such as in a hard-wired manner. In any of those particular embodiments, whether executing instructions stored on a device readable storage medium or not, processing circuitry 1820 can be configured to perform the described functionality. The benefits provided by such functionality are not limited to processing circuitry 1820 alone or to other components of WD 1810, but are enjoyed by WD 1810 as a whole, and/or by end users and the wireless network generally.

Processing circuitry 1820 may be configured to perform any determining, calculating, or similar operations (e.g., certain obtaining operations) described herein as being performed by a WD. These operations, as performed by processing circuitry 1820, may include processing information obtained by processing circuitry 1820 by, for example, converting the obtained information into other information, comparing the obtained information or converted information to information stored by WD 1810, and/or performing one or more operations based on the obtained information or converted information, and as a result of said processing making a determination.

Device readable medium 1830 may be operable to store a computer program, software, an application including one or more of logic, rules, code, tables, etc. and/or other instructions capable of being executed by processing circuitry 1820. Device readable medium 1830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1820. In some embodiments, processing circuitry 1820 and device readable medium 1830 may be considered to be integrated.

User interface equipment 1832 may provide components that allow for a human user to interact with WD 1810. Such interaction may be of many forms, such as visual, audial, tactile, etc. User interface equipment 1832 may be operable to produce output to the user and to allow the user to provide input to WD 1810. The type of interaction may vary depending on the type of user interface equipment 1832 installed in WD 1810. For example, if WD 1810 is a smart phone, the interaction may be via a touch screen: if WD 1810 is a smart meter, the interaction may be through a screen that provides usage (e.g., the number of gallons used) or a speaker that provides an audible alert (e.g., if smoke is detected). User interface equipment 1832 may include input interfaces, devices and circuits, and output interfaces, devices and circuits. User interface equipment 1832 is configured to allow input of information into WD 1810 and is connected to processing circuitry 1820 to allow processing circuitry 1820 to process the input information. User interface equipment 1832 may include, for example, a microphone, a proximity or other sensor, keys/buttons, a touch display, one or more cameras, a USB port, or other input circuitry. User interface equipment 1832 is also configured to allow output of information from WD 1810, and to allow processing circuitry 1820 to output information from WD 1810. User interface equipment 1832 may include, for example, a speaker, a display, vibrating circuitry, a USB port, a headphone interface, or other output circuitry. Using one or more input and output interfaces, devices, and circuits, of user interface equipment 1832, WD 1810 may communicate with end users and/or the wireless network and allow them to benefit from the functionality described herein.

Auxiliary equipment 1834 is operable to provide more specific functionality which may not be generally performed by WDs. This may comprise specialized sensors for doing measurements for various purposes, interfaces for additional types of communication such as wired communications etc. The inclusion and type of components of auxiliary equipment 1834 may vary depending on the embodiment and/or scenario.

Power source 1836 may, in some embodiments, be in the form of a battery or battery pack. Other types of power sources, such as an external power source (e.g., an electricity outlet), photovoltaic devices or power cells, may also be used. WD 1810 may further comprise power circuitry 1837 for delivering power from power source 1836 to the various parts of WD 1810 which need power from power source 1836 to carry out any functionality described or indicated herein. Power circuitry 1837 may in certain embodiments comprise power management circuitry. Power circuitry 1837 may additionally or alternatively be operable to receive power from an external power source: in which case WD 1810 may be connectable to the external power source (such as an electricity outlet) via input circuitry or an interface such as an electrical power cable. Power circuitry 1837 may also in certain embodiments be operable to deliver power from an external power source to power source 1836. This may be, for example, for the charging of power source 1836. Power circuitry 1837 may perform any formatting, converting, or other modification to the power from power source 1836 to make the power suitable for the respective components of WD 1810 to which power is supplied.

Figure 19:
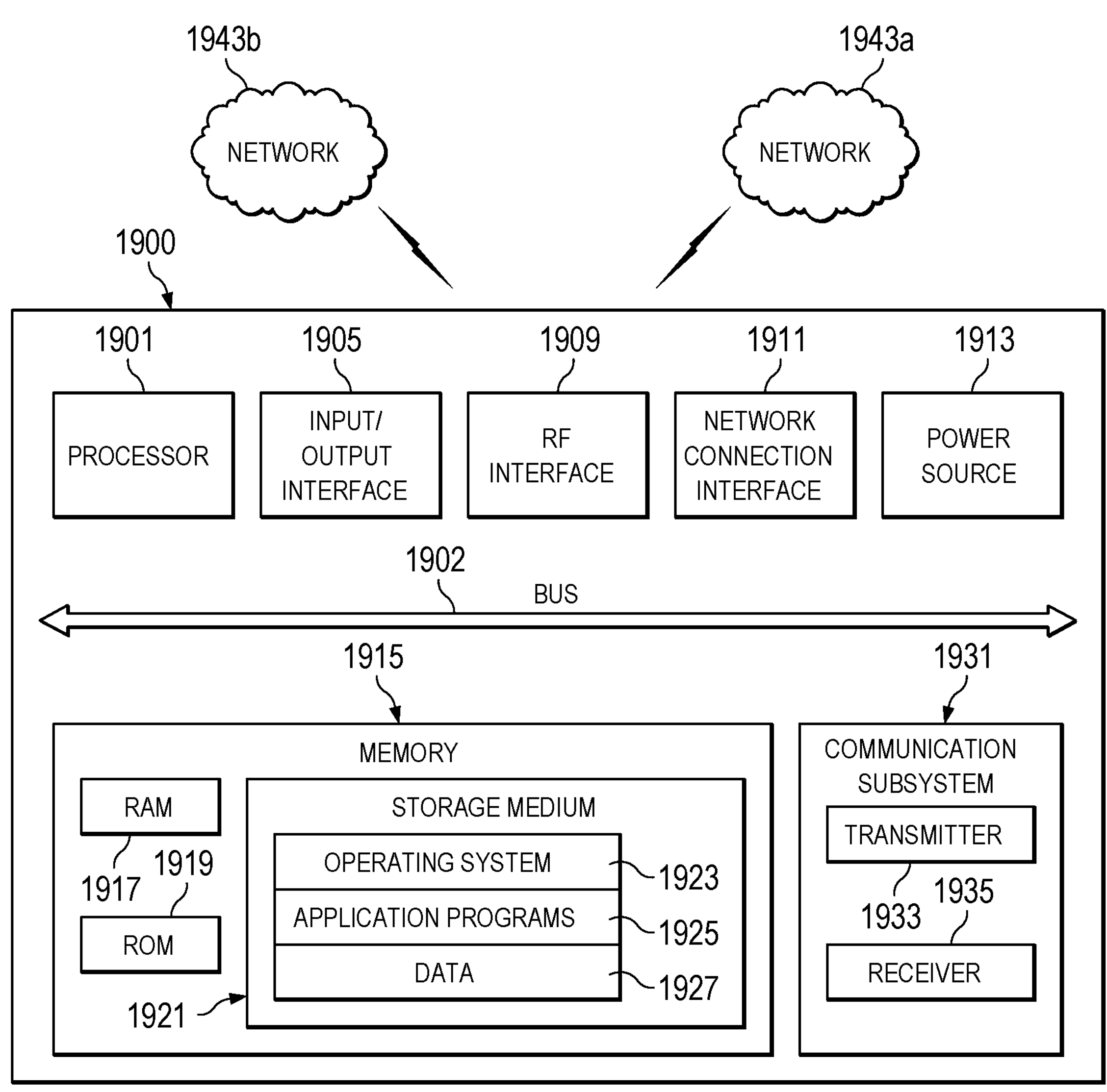
FIG. 19 is an illustration of a User Equipment (e.g., MS, wireless device) configured in accordance with an embodiment of the present disclosure.

FIG. 19 illustrates one embodiment of a UE 1900 in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1900 may be any UE identified by the 3rd Generation Partnership Project (3GPP), including a NB-IoT UE, a machine type communication (MTC) UE, and/or an enhanced MTC (eMTC) UE. UE 1900, as illustrated in FIG. 19, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 19 is a UE, the components discussed herein are equally applicable to a WD, and vice-versa.

In FIG. 19, UE 1900 includes processing circuitry 1901 that is operatively coupled to input/output interface 1905, radio frequency (RF) interface 19019, network connection interface 1911, memory 1915 including random access memory (RAM) 1917, read-only memory (ROM) 1919, and storage medium 1921 or the like, communication subsystem 1931, power source 1933, and/or any other component, or any combination thereof. Storage medium 1921 includes operating system 1923, application program 1925, and data 1927. In other embodiments, storage medium 1921 may include other similar types of information. Certain UEs may utilize all of the components shown in FIG. 19, or only a subset of the components. The level of integration between the components may vary from one UE to another UE. Further, certain UEs may contain multiple instances of a component, such as multiple processors, memories, transceivers, transmitters, receivers, etc.

In FIG. 19, processing circuitry 1901 may be configured to process computer instructions and data. Processing circuitry 1901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware: one or more stored program, general-purpose processors, such as a microprocessor or Digital Signal Processor (DSP), together with appropriate software: or any combination of the above. For example, the processing circuitry 1901 may include two central processing units (CPUs). Data may be information in a form suitable for use by a computer.

In the depicted embodiment, input/output interface 1905 may be configured to provide a communication interface to an input device, output device, or input and output device. UE 1900 may be configured to use an output device via input/output interface 1905. An output device may use the same type of interface port as an input device. For example, a USB port may be used to provide input to and output from UE 1900. The output device may be a speaker, a sound card, a video card, a display, a monitor, a printer, an actuator, an emitter, a smartcard, another output device, or any combination thereof. UE 1900 may be configured to use an input device via input/output interface 1905 to allow a user to capture information into UE 1900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 19, RF interface 1909 may be configured to provide a communication interface to RF components such as a transmitter, a receiver, and an antenna. Network connection interface 1911 may be configured to provide a communication interface to network 1943*a*. Network 1943*a* may encompass wired and/or wireless networks such as a local-area network (LAN), a wide-area network (WAN), a computer network, a wireless network, a telecommunications network, another like network or any combination thereof. For example, network 1943*a* may comprise a Wi-Fi network. Network connection interface 1911 may be configured to include a receiver and a transmitter interface used to communicate with one or more other devices over a communication network according to one or more communication protocols, such as Ethernet, TCP/IP, SONET, ATM, or the like. Network connection interface 1911 may implement receiver and transmitter functionality appropriate to the communication network links (e.g., optical, electrical, and the like). The transmitter and receiver functions may share circuit components, software or firmware, or alternatively may be implemented separately.

RAM 1917 may be configured to interface via bus 1902 to processing circuitry 1901 to provide storage or caching of data or computer instructions during the execution of software programs such as the operating system, application programs, and device drivers. ROM 1919 may be configured to provide computer instructions or data to processing circuitry 1901. For example, ROM 1919 may be configured to store invariant low-level system code or data for basic system functions such as basic input and output (I/O), startup, or reception of keystrokes from a keyboard that are stored in a non-volatile memory. Storage medium 1921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1921 may be configured to include operating system 1923, application program 1925 such as a web browser application, a widget or gadget engine or another application, and data file 1927. Storage medium 1921 may store, for use by UE 1900, any of a variety of various operating systems or combinations of operating systems.

Storage medium 1921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1921 may allow UE 1900 to access computer-executable instructions, application programs or the like, stored on transitory or non-transitory memory media, to off-load data, or to upload data. An article of manufacture, such as one utilizing a communication system may be tangibly embodied in storage medium 1921, which may comprise a device readable medium.

In FIG. 19, processing circuitry 1901 may be configured to communicate with network 1943*b* using communication subsystem 1931. Network 1943*a* and network 1943*b* may be the same network or networks or different network or networks. Communication subsystem 1931 may be configured to include one or more transceivers used to communicate with network 1943*b*. For example, communication subsystem 1931 may be configured to include one or more transceivers used to communicate with one or more remote transceivers of another device capable of wireless communication such as another WD, UE, or base station of a radio access network (RAN) according to one or more communication protocols, such as IEEE 802.4, CDMA, WCDMA, GSM, LTE, UTRAN, WiMax, or the like. Each transceiver may include transmitter 1933 and/or receiver 1935 to implement transmitter or receiver functionality, respectively, appropriate to the RAN links (e.g., frequency allocations and the like). Further, transmitter 1933 and receiver 1935 of each transceiver may share circuit components, software or firmware, or alternatively may be implemented separately.

In the illustrated embodiment, the communication functions of communication subsystem 1931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1931 may include cellular communication, Wi-Fi communication, Bluetooth communication, and GPS communication. Network 1943*b* may encompass wired and/or wireless networks such as a local-area network (LAN), a wide-area network (WAN), a computer network, a wireless network, a telecommunications network, another like network or any combination thereof. For example, network 1943*b* may be a cellular network, a Wi-Fi network, and/or a near-field network. Power source 1913 may be configured to provide alternating current (AC) or direct current (DC) power to components of UE 1900.

The features, benefits and/or functions described herein may be implemented in one of the components of UE 1900 or partitioned across multiple components of UE 1900. Further, the features, benefits, and/or functions described herein may be implemented in any combination of hardware, software or firmware. In one example, communication subsystem 1931 may be configured to include any of the components described herein. Further, processing circuitry 1901 may be configured to communicate with any of such components over bus 1902. In another example, any of such components may be represented by program instructions stored in memory that when executed by processing circuitry 1901 perform the corresponding functions described herein. In another example, the functionality of any of such components may be partitioned between processing circuitry 1901 and communication subsystem 1931. In another example, the non-computationally intensive functions of any of such components may be implemented in software or firmware and the computationally intensive functions may be implemented in hardware.

Figure 20:
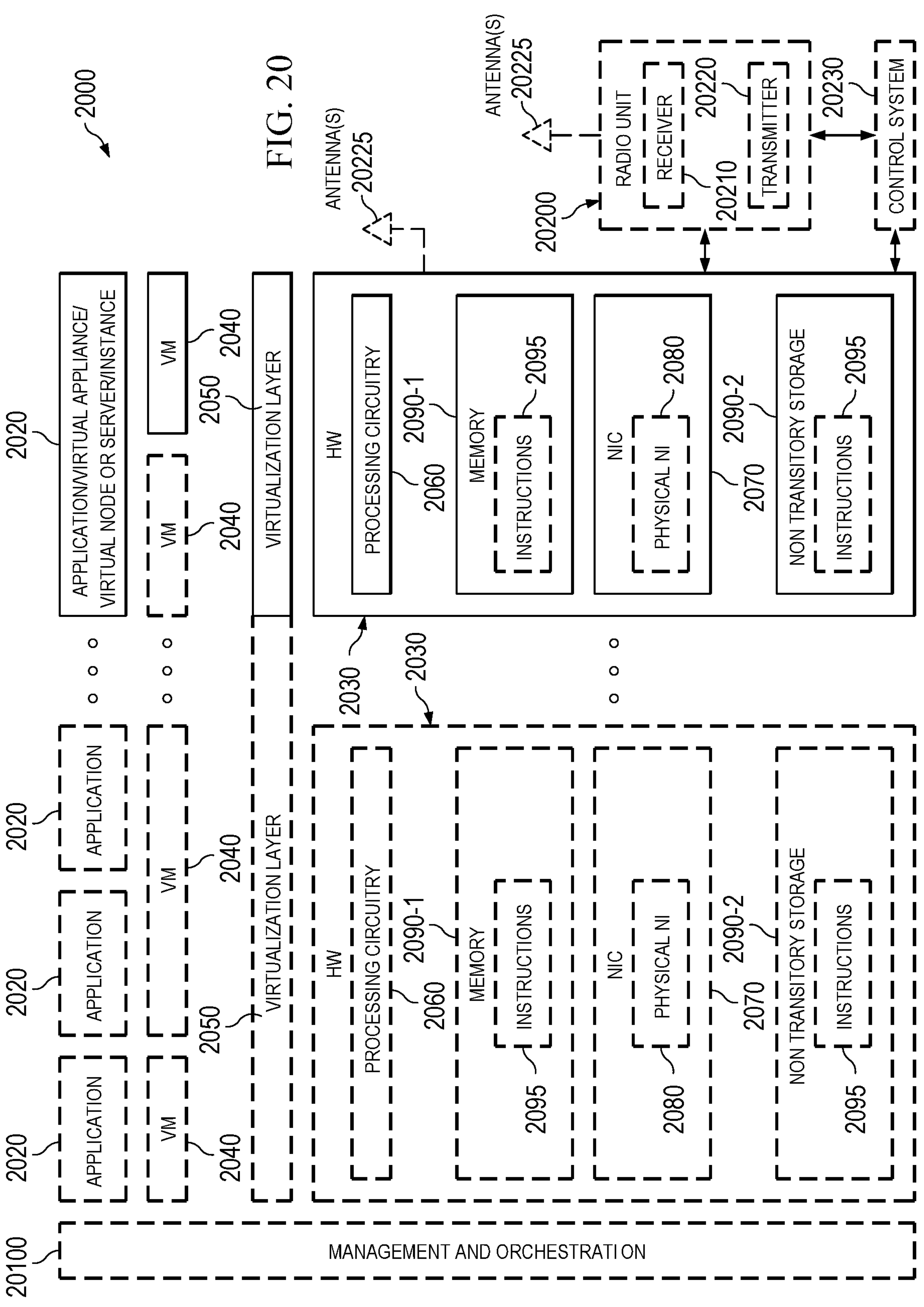
FIG. 20 is an illustration of a virtualization environment in accordance with some embodiments of the present disclosure.

FIG. 20 is a schematic block diagram illustrating a virtualization environment 2000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2000 hosted by one or more of hardware nodes 2030. Further, in embodiments in which the virtual node is not a radio access node or does not require radio connectivity (e.g., a core network node), then the network node may be entirely virtualized.

The functions may be implemented by one or more applications 2020 (which may alternatively be called software instances, virtual appliances, network functions, virtual nodes, virtual network functions, etc.) operative to implement some of the features, functions, and/or benefits of some of the embodiments disclosed herein. Applications 2020 are run in virtualization environment 2000 which provides hardware 2030 comprising processing circuitry 2060 and memory 2090. Memory 2090 contains instructions 2095 executable by processing circuitry 2060 whereby application 2020 is operative to provide one or more of the features, benefits, and/or functions disclosed herein.

Virtualization environment 2000, comprises general-purpose or special-purpose network hardware devices 2030 comprising a set of one or more processors or processing circuitry 2060, which may be commercial off-the-shelf (COTS) processors, dedicated Application Specific Integrated Circuits (ASICs), or any other type of processing circuitry including digital or analog hardware components or special purpose processors. Each hardware device may comprise memory 2090-1 which may be non-persistent memory for temporarily storing instructions 2095 or software executed by processing circuitry 2060. Each hardware device may comprise one or more network interface controllers (NICs) 2070, also known as network interface cards, which include physical network interface 2080. Each hardware device may also include non-transitory, persistent, machine-readable storage media 2090-2 having stored therein software 2095 and/or instructions executable by processing circuitry 2060. Software 2095 may include any type of software including software for instantiating one or more virtualization layers 2050 (also referred to as hypervisors), software to execute virtual machines 2040 as well as software allowing it to execute functions, features and/or benefits described in relation with some embodiments described herein.

Virtual machines 2040, comprise virtual processing, virtual memory, virtual networking or interface and virtual storage, and may be run by a corresponding virtualization layer 2050 or hypervisor. Different embodiments of the instance of virtual appliance 2020 may be implemented on one or more of virtual machines 2040, and the implementations may be made in different ways.

During operation, processing circuitry 2060 executes software 2095 to instantiate the hypervisor or virtualization layer 2050, which may sometimes be referred to as a virtual machine monitor (VMM). Virtualization layer 2050 may present a virtual operating platform that appears like networking hardware to virtual machine 2040.

As shown in FIG. 20, hardware 2030 may be a standalone network node with generic or specific components. Hardware 2030 may comprise antenna 20225 and may implement some functions via virtualization. Alternatively, hardware 2030 may be part of a larger cluster of hardware (e.g., such as in a data center or customer premise equipment (CPE)) where many hardware nodes work together and are managed via management and orchestration (MANO) 20100, which, among others, oversees lifecycle management of applications 2020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2040 may be a software implementation of a physical machine that runs programs as if they were executing on a physical, non-virtualized machine. Each of virtual machines 2040, and that part of hardware 2030 that executes that virtual machine, be it hardware dedicated to that virtual machine and/or hardware shared by that virtual machine with others of the virtual machines 2040, forms a separate virtual network elements (VNE).

Still in the context of NFV, Virtual Network Function (VNF) is responsible for handling specific network functions that run in one or more virtual machines 2040 on top of hardware networking infrastructure 530 and corresponds to application 2020 in FIG. 20.

In some embodiments, one or more radio units 20200 that each include one or more transmitters 20220 and one or more receivers 20210 may be coupled to one or more antennas 20225. Radio units 20200 may communicate directly with hardware nodes 2030 via one or more appropriate network interfaces and may be used in combination with the virtual components to provide a virtual node with radio capabilities, such as a radio access node or a base station.

In some embodiments, some signalling can be affected with the use of control system 20230 which may alternatively be used for communication between the hardware nodes 2030 and radio units 20200.

Figure 21:
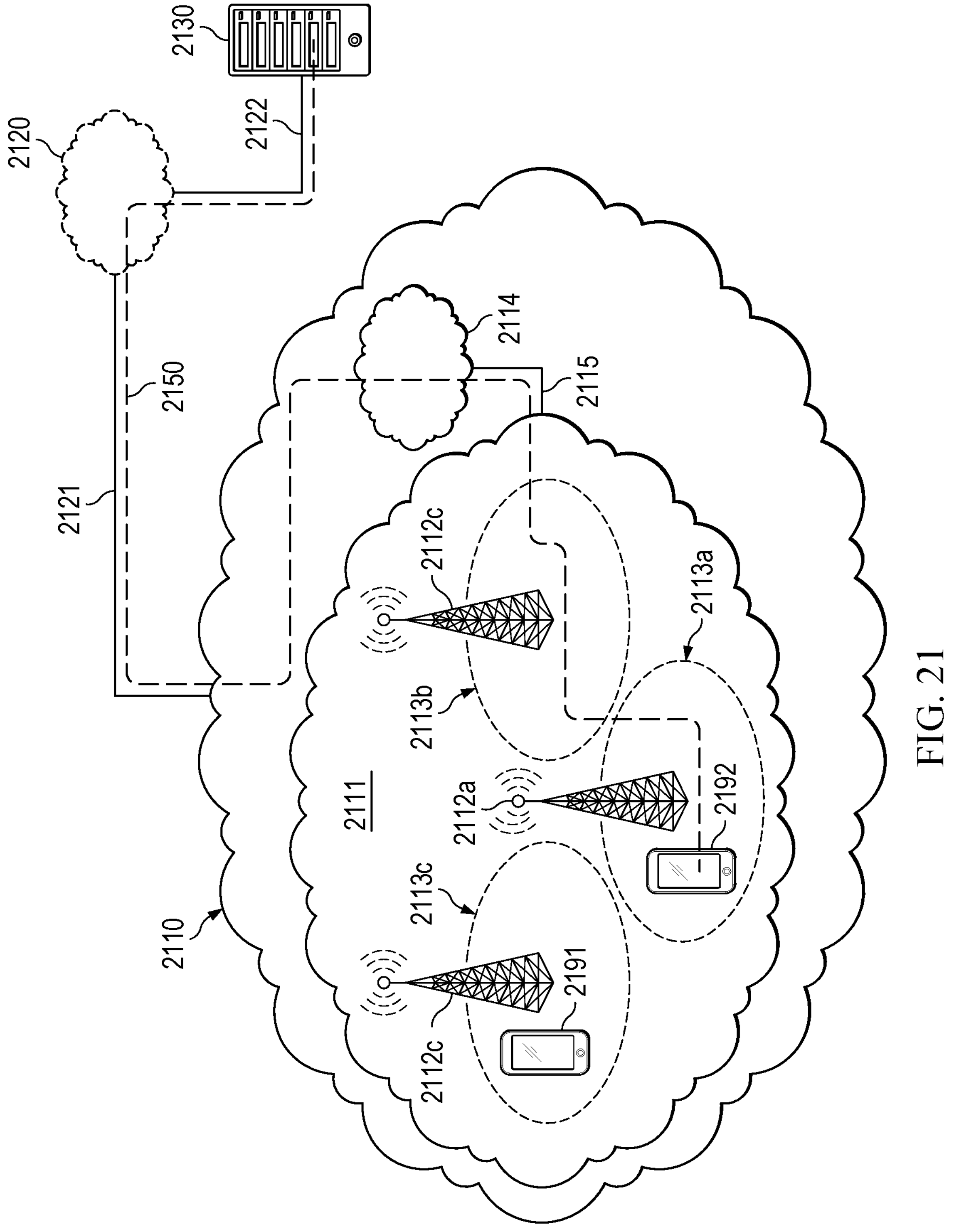
FIG. 21 is an illustration of a telecommunication network connected via an intermediate network to a host computer in accordance with some embodiments of the present disclosure.

With reference to FIG. 21, in accordance with an embodiment, a communication system includes telecommunication network 2110, such as a 3GPP-type cellular network, which comprises access network 2111, such as a radio access network, and core network 2114. Access network 2111 comprises a plurality of base stations **2112*a*, 2112*b*, 2112*c*, such as NBs, eNBs, gNBs or other types of wireless access points, each defining a corresponding coverage area 2113*a*, 2113*b*, 2113*c*. Each base station 2112*a*, 2112*b*, 2112*c* is connectable to core network 2114 over a wired or wireless connection 2115. A first UE 2191 located in coverage area 2113*c* is configured to wirelessly connect to, or be paged by, the corresponding base station 2112*c*. A second UE 2192 in coverage area 2113***a* is wirelessly connectable to the corresponding base station 2112*a*. While a plurality of UEs 2191, 2192 are illustrated in this example, the disclosed embodiments are equally applicable to a situation where a sole UE is in the coverage area or where a sole UE is connecting to the corresponding base station 2112.

Telecommunication network 2110 is itself connected to host computer 2130, which may be embodied in the hardware and/or software of a standalone server, a cloud-implemented server, a distributed server or as processing resources in a server farm. Host computer 2130 may be under the ownership or control of a service provider, or may be operated by the service provider or on behalf of the service provider. Connections 2121 and 2122 between telecommunication network 2110 and host computer 2130 may extend directly from core network 2114 to host computer 2130 or may go via an optional intermediate network 2120. Intermediate network 2120 may be one of, or a combination of more than one of, a public, private or hosted network: intermediate network 2120, if any, may be a backbone network or the Internet: in particular, intermediate network 2120 may comprise two or more sub-networks (not shown).

The communication system of FIG. 21 as a whole enables connectivity between the connected UEs 2191, 2192 and host computer 2130. The connectivity may be described as an over-the-top (OTT) connection 2150. Host computer 2130 and the connected UEs 2191, 2192 are configured to communicate data and/or signaling via OTT connection 2150, using access network 2111, core network 2114, any intermediate network 2120 and possible further infrastructure (not shown) as intermediaries. OTT connection 2150 may be transparent in the sense that the participating communication devices through which OTT connection 2150 passes are unaware of routing of uplink and downlink communications. For example, base station 2112 may not or need not be informed about the past routing of an incoming downlink communication with data originating from host computer 2130 to be forwarded (e.g., handed over) to a connected UE 2191. Similarly, base station 2112 need not be aware of the future routing of an outgoing uplink communication originating from the UE 2191 towards the host computer 2130.

Example implementations, in accordance with an embodiment, of the UE, base station and host computer discussed in the preceding paragraphs will now be described with reference to FIG. 22. In communication system 2200, host computer 2210 comprises hardware 2215 including communication interface 2216 configured to set up and maintain a wired or wireless connection with an interface of a different communication device of communication system 2200. Host computer 2210 further comprises processing circuitry 2218, which may have storage and/or processing capabilities. In particular, processing circuitry 2218 may comprise one or more programmable processors, application-specific integrated circuits, field programmable gate arrays or combinations of these (not shown) adapted to execute instructions. Host computer 2210 further comprises software 2211, which is stored in or accessible by host computer 2210 and executable by processing circuitry 2218. Software 2211 includes host application 2212. Host application 2212 may be operable to provide a service to a remote user, such as UE 2230 connecting via OTT connection 2250 terminating at UE 2230 and host computer 2210. In providing the service to the remote user, host application 2212 may provide user data which is transmitted using OTT connection 2250.

Communication system 2200 further includes base station 2220 provided in a telecommunication system and comprising hardware 2225 enabling it to communicate with host computer 2210 and with UE 2230. Hardware 2225 may include communication interface 2226 for setting up and maintaining a wired or wireless connection with an interface of a different communication device of communication system 2200, as well as radio interface 2227 for setting up and maintaining at least wireless connection 2270 with UE 2230 located in a coverage area (not shown in FIG. 22) served by base station 2220. Communication interface 2226 may be configured to facilitate connection 2260 to host computer 2210. Connection 2260 may be direct, or it may pass through a core network (not shown in FIG. 22) of the telecommunication system and/or through one or more intermediate networks outside the telecommunication system. In the embodiment shown, hardware 2225 of base station 2220 further includes processing circuitry 2228, which may comprise one or more programmable processors, application-specific integrated circuits, field programmable gate arrays or combinations of these (not shown) adapted to execute instructions. Base station 2220 further has software 2221 stored internally or accessible via an external connection.

Communication system 2200 further includes UE 2230 already referred to. Its hardware 2235 may include radio interface 2237 configured to set up and maintain wireless connection 2270 with a base station serving a coverage area in which UE 2230 is currently located. Hardware 2235 of UE 2230 further includes processing circuitry 2238, which may comprise one or more programmable processors, application-specific integrated circuits, field programmable gate arrays or combinations of these (not shown) adapted to execute instructions. UE 2230 further comprises software 2231, which is stored in or accessible by UE 2230 and executable by processing circuitry 2238. Software 2231 includes client application 2232. Client application 2232 may be operable to provide a service to a human or non-human user via UE 2230, with the support of host computer 2210. In host computer 2210, an executing host application 2212 may communicate with the executing client application 2232 via OTT connection 2250 terminating at UE 2230 and host computer 2210. In providing the service to the user, client application 2232 may receive request data from host application 2212 and provide user data in response to the request data. OTT connection 2250 may transfer both the request data and the user data. Client application 2232 may interact with the user to generate the user data that it provides.

Figure 22:
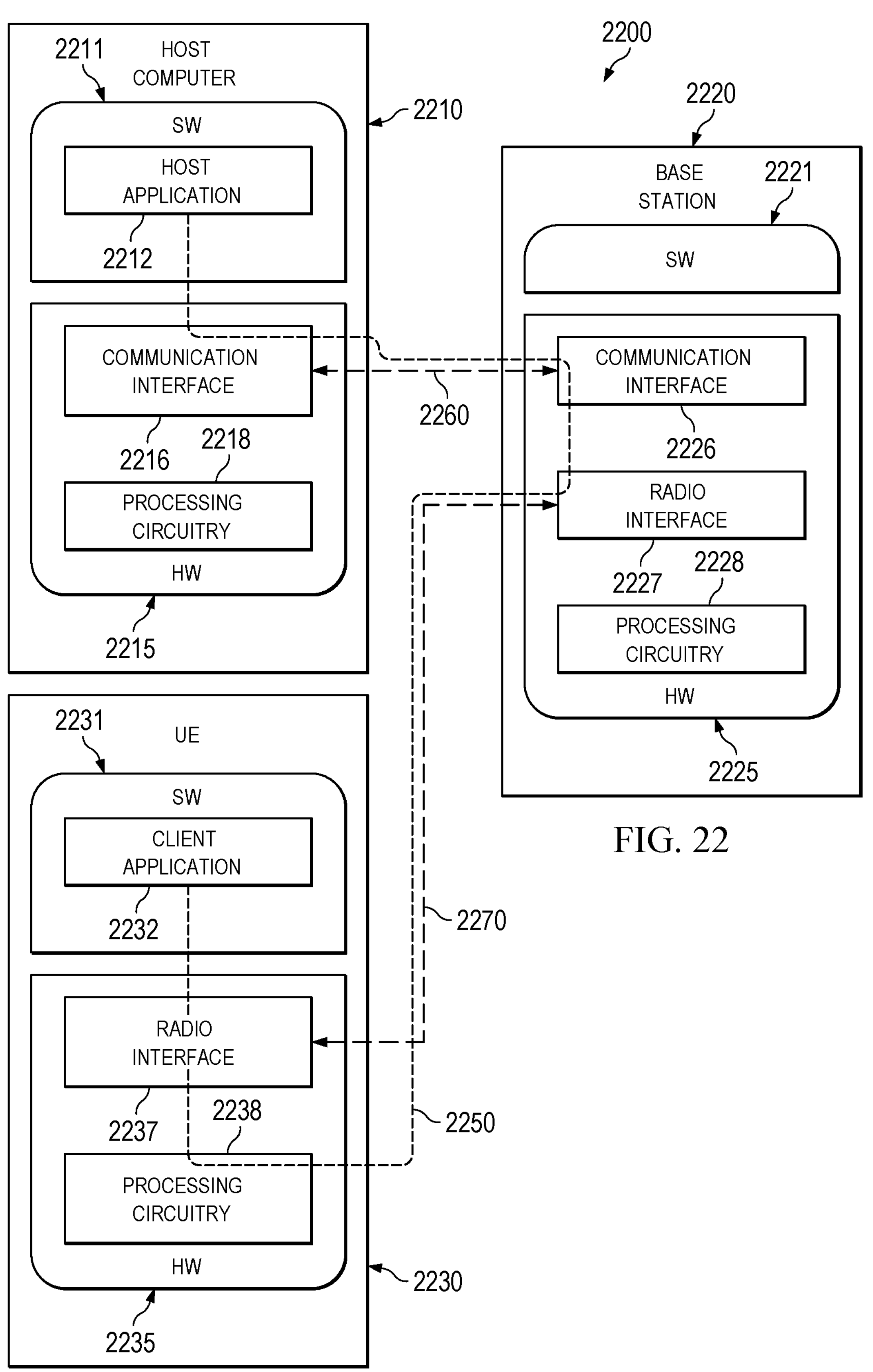
FIG. 22 is an illustration of a host computer communicating via a base station with a user equipment over a partially wireless connection in accordance with some embodiments of the present disclosure.

It is noted that host computer 2210, base station 2220 and UE 2230 illustrated in FIG. 22 may be similar or identical to host computer 2130, one of base stations 2112*a*, 2112*b*, 2112*c* and one of UEs 2191, 2192 of FIG. 21, respectively. This is to say, the inner workings of these entities may be as shown in FIG. 22 and independently, the surrounding network topology may be that of FIG. 21.

In FIG. 22, OTT connection 2250 has been drawn abstractly to illustrate the communication between host computer 2210 and UE 2230 via base station 2220, without explicit reference to any intermediary devices and the precise routing of messages via these devices. Network infrastructure may determine the routing, which it may be configured to hide from UE 2230 or from the service provider operating host computer 2210, or both. While OTT connection 2250 is active, the network infrastructure may further take decisions by which it dynamically changes the routing (e.g., on the basis of load balancing consideration or reconfiguration of the network).

Wireless connection 2270 between UE 2230 and base station 2220 is in accordance with the teachings of the embodiments described throughout this disclosure. One or more of the various embodiments improve the performance of OTT services provided to UE 2230 using OTT connection 2250, in which wireless connection 2270 forms the last segment. More precisely, the teachings of these embodiments may improve the security in accurate position estimation of the UE 2230 and thereby provide benefits such as increasing security to a user's applications and data: reducing uplink latency which makes a vehicular communication service safer; and conserving uplink transmit energy which extends the lifetime of battery-powered sensors and meters.

A measurement procedure may be provided for the purpose of monitoring data rate, latency and other factors on which the one or more embodiments improve. There may further be an optional network functionality for reconfiguring OTT connection 2250 between host computer 2210 and UE 2230, in response to variations in the measurement results. The measurement procedure and/or the network functionality for reconfiguring OTT connection 2250 may be implemented in software 2211 and hardware 2215 of host computer 2210 or in software 2231 and hardware 2235 of UE 2230, or both. In embodiments, sensors (not shown) may be deployed in or in association with communication devices through which OTT connection 2250 passes: the sensors may participate in the measurement procedure by supplying values of the monitored quantities exemplified above, or supplying values of other physical quantities from which software 2211, 2231 may compute or estimate the monitored quantities. The reconfiguring of OTT connection 2250 may include message format, retransmission settings, preferred routing etc.: the reconfiguring need not affect base station 2220, and it may be unknown or imperceptible to base station 2220. Such procedures and functionalities may be known and practiced in the art. In certain embodiments, measurements may involve proprietary UE signaling facilitating host computer 2210's measurements of throughput, propagation times, latency and the like. The measurements may be implemented in that software 2211 and 2231 causes messages to be transmitted, in particular empty or 'dummy' messages, using OTT connection 2250 while it monitors propagation times, errors etc.

Figure 23:
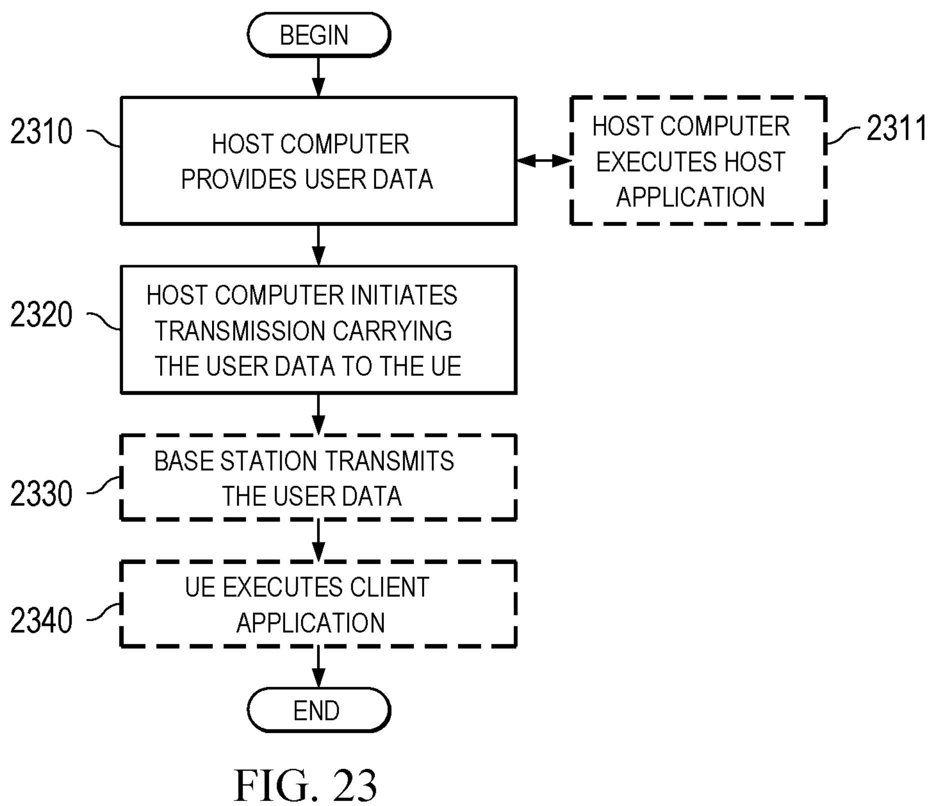
FIG. 23 is an illustration of methods implemented in a communication system including a host computer, a base station and a user equipment in accordance with some embodiments of the present disclosure.

FIG. 23 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 23 will be included in this section. In step 2310, the host computer provides user data. In substep 2311 (which may be optional) of step 2310, the host computer provides the user data by executing a host application. In step 2320, the host computer initiates a transmission carrying the user data to the UE. In step 2330 (which may be optional), the base station transmits to the UE the user data which was carried in the transmission that the host computer initiated, in accordance with the teachings of the embodiments described throughout this disclosure. In step 2340 (which may also be optional), the UE executes a client application associated with the host application executed by the host computer.

Figure 24:
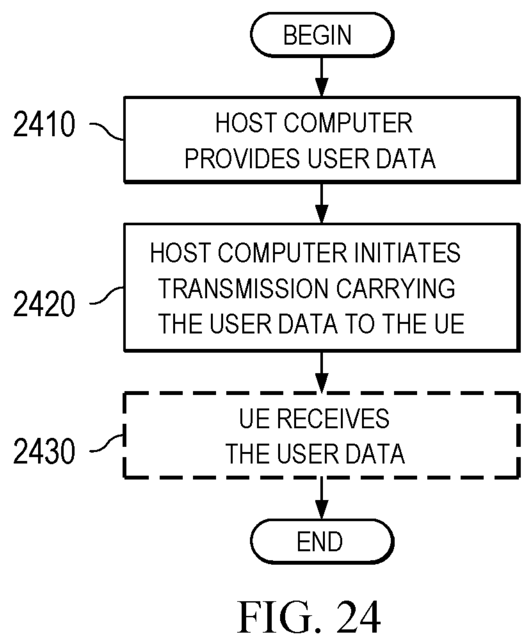
FIG. 24 is an illustration of methods implemented in a communication system including a host computer, a base station and a user equipment in accordance with some embodiments of the present disclosure.

FIG. 24 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 24 will be included in this section. In step 2410 of the method, the host computer provides user data. In an optional substep (not shown) the host computer provides the user data by executing a host application. In step 2420, the host computer initiates a transmission carrying the user data to the UE. The transmission may pass via the base station, in accordance with the teachings of the embodiments described throughout this disclosure. In step 2430 (which may be optional), the UE receives the user data carried in the transmission.

Figure 25:
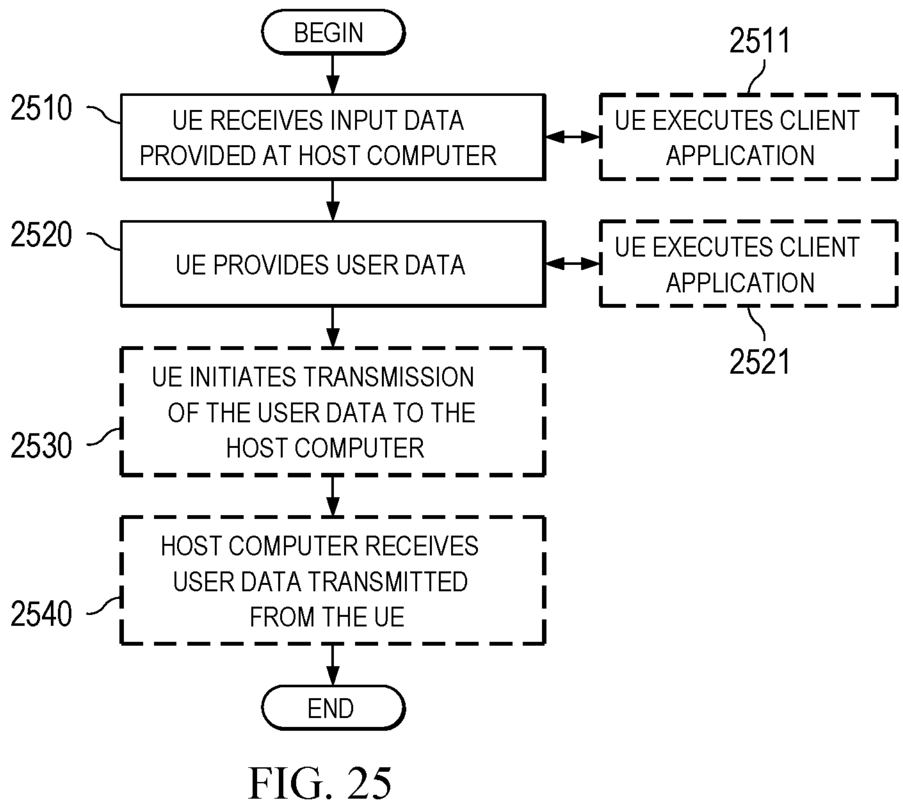
FIG. 25 is an illustration of methods implemented in a communication system including a host computer, a base station and a user equipment in accordance with some embodiments of the present disclosure; and, FIG. 26 is an illustration of methods implemented in a communication system including a host computer, a base station and a user equipment in accordance with some embodiments of the present disclosure.

FIG. 25 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 25 will be included in this section. In step 2510 (which may be optional), the UE receives input data provided by the host computer. Additionally or alternatively, in step 2520, the UE provides user data. In substep 2521 (which may be optional) of step 2520, the UE provides the user data by executing a client application. In substep 2511 (which may be optional) of step 2510, the UE executes a client application which provides the user data in reaction to the received input data provided by the host computer. In providing the user data, the executed client application may further consider user input received from the user. Regardless of the specific manner in which the user data was provided, the UE initiates, in substep 2530 (which may be optional), transmission of the user data to the host computer. In step 2540 of the method, the host computer receives the user data transmitted from the UE, in accordance with the teachings of the embodiments described throughout this disclosure.

Figure 26:
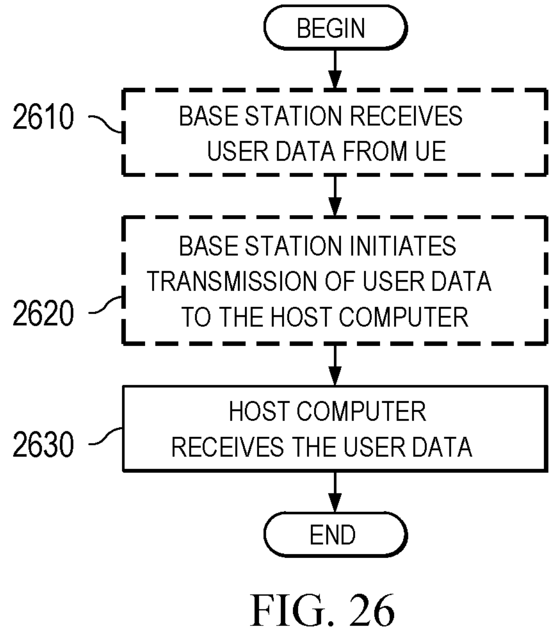

FIG. 26 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 26 will be included in this section. In step 2610 (which may be optional), in accordance with the teachings of the embodiments described throughout this disclosure, the base station receives user data from the UE. In step 2620 (which may be optional), the base station initiates transmission of the received user data to the host computer. In step 2630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Exemplary Embodiments

Group A Embodiments

1. A method performed by a network node which interacts with a terminal node, the method comprising:
computing an EVM of the network node;
determining a rank restriction, if any, for the terminal node based on (1) the computed EVM and (2) a geometry or path loss of the terminal node, wherein the determined rank restriction indicates a rank restriction required by the network node for transmitting data to the terminal node;
communicating, to the terminal node, rank restriction information, wherein the rank restriction information is based on the determined rank restriction;
receiving, from the terminal node, a CSI report which include preferred rank information within a rank restriction set, wherein the preferred rank information is associated with the rank restriction information;
determining scheduling parameters for scheduling the terminal node, wherein the scheduling parameters are determined using at least the preferred rank information in the CSI report;
transmitting, to the terminal node, the scheduling parameters; and, transmitting, to the terminal node, the data based on the scheduling parameters.

2. The method of embodiment 1, wherein the computing the EVM further comprises:
measuring the EVM at an output of a transmitter RF front end of the network node.

3. The method of embodiment 1, wherein the computing the EVM further comprises:
estimating an ACLR at the network node; and,
estimating the EVM based on the estimated ACLR.

4. The method of embodiment 1, wherein the determining the rank restriction further comprises:
determining whether the computed EVM satisfies a standardized EVM requirement for 256 QAM;
based on the determination that the computed EVM satisfies the standardized EVM requirement for 256 QAM, determine that rank restriction is not applied;
based on the determination that the computed EVM does not satisfy the standardized EVM requirement for 256 QAM, determining whether the computed EVM satisfies a standardized EVM requirement for 64 QAM:
based on the determination that the computed EVM satisfies the standardized EVM requirement for 64 QAM, setting a geometry threshold G_th to a first predetermined value and computing a geometry G of the terminal node;
based on the determination that the computed EVM does not satisfy the standardized EVM requirement for 64 QAM, determining whether the computed EVM satisfies a standardized EVM requirement for 16 QAM:
based on the determination that the computed EVM satisfies the standardized EVM requirement for 16 QAM, setting the geometry threshold G_th to a second predetermined value that is less than the first predetermined value and computing a geometry G of the terminal node:
based on the determination that the computed EVM does not satisfy the standardized EVM requirement for 16 QAM, setting the geometry threshold G_th to a third predetermined value that is less than the second predetermined value and computing a geometry G of the terminal node;
after performing the computing step in which the geometry G of the terminal node is determined, determining whether the computed geometry G of the terminal node is greater or less than the set first, second, or third predetermined value of the geometry threshold G_th:
based on the determination that the computed geometry G of the terminal node is less than or equal to the set first, second, or third predetermined value of the geometry threshold G_th, determine that rank restriction is not applied to the terminal node; and,
based on the determination that the computed geometry G of the terminal node is greater than the set first, second, or third predetermined value of the geometry threshold G_th, applying rank restriction to the terminal node.

5. The method of embodiment 4, wherein the computing the geometry G of the terminal node further comprises:
averaging over time multiple received CQI or CSI reports to estimate the geometry G of the terminal node.

6. The method of embodiment 1, wherein the determining the rank restriction further comprises:
determining whether the computed EVM satisfies a standardized EVM requirement for 256 QAM;
based on the determination that the computed EVM satisfies the standardized EVM requirement for 256 QAM, determine that rank restriction is not applied;
based on the determination that the computed EVM does not satisfy the standardized EVM requirement for 256 QAM, determining whether the computed EVM satisfies a standardized EVM requirement for 64 QAM:
based on the determination that the computed EVM satisfies the standardized EVM requirement for 64 QAM, setting a path loss threshold PL_th to a first predetermined value and computing a path loss PL of the terminal node;
based on the determination that the computed EVM does not satisfy the standardized EVM requirement for 64 QAM, determining whether the computed EVM satisfies a standardized EVM requirement for 16 QAM:
based on the determination that the computed EVM satisfies the standardized EVM requirement for 16 QAM, setting the path loss threshold PL_th to a second predetermined value that is greater than the first predetermined value and computing a path loss PL of the terminal node:
based on the determination that the computed EVM does not satisfy the standardized EVM requirement for 16 QAM, setting the path loss threshold PL_th to a third predetermined value that is greater than the second predetermined value and compute a path loss PL of the terminal node:

after performing the computing step in which the path loss PL of the terminal node is determined, determining whether the computed path loss PL of the terminal node is greater or less than the set first, second, or third predetermined value of the path loss threshold PL_th;

based on the determination that the computed pass loss PL of the terminal node is greater than or equal to the set first, second, or third predetermined value of the path loss threshold PL_th, determine that rank restriction is not applied to the terminal node; and, based on the determination that the computed path loss PL of the terminal node is less than the set first, second, or third predetermined value of the path loss threshold PL_th, applying rank restriction to the terminal node.

7. The method of embodiment 6, wherein the computing the path loss PL of the terminal node further comprises:

compute the geometry of the terminal node by averaging over time multiple received CQI or CSI reports;

calculate the path loss PL of the terminal node which is equal to 1/geometry.

8. The method of embodiment 1, wherein the communicating the rank restriction information to the terminal node comprises using higher level signalling to:

send a codebook subset restriction bit map with all lower ranks set to zero such that the terminal node upon receiving the codebook subset restriction bit map does not consider a specific rank hypothesis when the corresponding rank has a bit set to zero;

send a rank bit map where a rank associated with a bit set to zero indicates that the terminal node shall not consider a corresponding rank hypothesis; or inform implicitly that the terminal node is not to use rank 1 for CSI reporting.

9. The method of any of the previous embodiments, further comprising:

providing user data; and forwarding the user data to a host computer via the transmission to the network node.

Group B Embodiments

10. A method in a terminal node which interacts with a network node, the method comprising:

receiving, from the network node, rank restriction information which indicates the rank restriction required by the network node for transmitting data to the terminal node;

computing a CSI report which includes preferred rank information within a rank restriction set, wherein the preferred rank information is based on the received rank restriction information;

communicating, to the network node, the computed CSI report including the preferred rank information;

receiving, from the network node, scheduling parameters on a downlink control channel, wherein the scheduling parameters are based in part on the preferred rank information in the CSI report; and, receiving, from the network node, the data.

11. The method of embodiment 10, wherein the computing the CSI report further comprises:

choosing the best Channel Quality Indicator (CQI) from those ranks as specified in the rank restriction information provided by the network node.

12. The method of any of the previous embodiments, further comprising:

obtaining user data; and forwarding the user data to a host computer or a wireless device.

Group C Embodiments

13. A network node comprising:

processing circuitry configured to perform any of the steps of any of the Group A embodiments; and power supply circuitry configured to supply power to the network node.

14. A terminal node comprising:

processing circuitry configured to perform any of the steps of any of the Group B embodiments;

power supply circuitry configured to supply power to the terminal node.

15. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group B embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

16. A communication system including a host computer comprising:

processing circuitry configured to provide user data; and a communication interface configured to forward the user data to a cellular network for transmission to a user equipment (UE), wherein the cellular network comprises a network node having a radio interface and processing circuitry, the network node's processing circuitry configured to perform any of the steps of any of the Group A embodiments.

17. The communication system of the pervious embodiment further including the network node.

18. The communication system of the previous 2 embodiments, further including the UE, wherein the UE is configured to communicate with the network node.

19. The communication system of the previous 3 embodiments, wherein:

the processing circuitry of the host computer is configured to execute a host application, thereby providing the user data; and the UE comprises processing circuitry configured to execute a client application associated with the host application.

20. A method implemented in a communication system including a host computer, a network node and a user equipment (UE), the method comprising:

at the host computer, providing user data; and at the host computer, initiating a transmission carrying the user data to the UE via a cellular network comprising the base station, wherein the network node performs any of the steps of any of the Group A embodiments.

21. The method of the previous embodiment, further comprising, at the network node, transmitting the user data.

22. The method of the previous 2 embodiments, wherein the user data is provided at the host computer by executing a host application, the method further comprising, at the UE, executing a client application associated with the host application.

23. A user equipment (UE) configured to communicate with a network node, the UE comprising a radio interface and processing circuitry configured to performs anyone of the previous 3 embodiments.

24. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group B embodiments.

25. The communication system of the previous embodiment, wherein the cellular network further includes a network node configured to communicate with the UE.

26. The communication system of the previous 2 embodiments, wherein:

the processing circuitry of the host computer is configured to execute a host application, thereby providing the user data; and the UE's processing circuitry is configured to execute a client application associated with the host application.

27. A method implemented in a communication system including a host computer, a network node and a user equipment (UE), the method comprising:

at the host computer, providing user data; and at the host computer, initiating a transmission carrying the user data to the UE via a cellular network comprising the base station, wherein the UE performs any of the steps of any of the Group B embodiments.

28 The method of the previous embodiment, further comprising at the UE, receiving the user data from the network node.

29. A communication system including a host computer comprising:

communication interface configured to receive user data originating from a transmission from a user equipment (UE) to a network node, wherein the UE comprises a radio interface and processing circuitry, the UE's processing circuitry configured to perform any of the steps of any of the Group B embodiments.

30. The communication system of the previous embodiment, further including the UE.

31. The communication system of the previous 2 embodiments, further including the network node, wherein the network node comprises a radio interface configured to communicate with the UE and a communication interface configured to forward to the host computer the user data carried by a transmission from the UE to the network node.

32. The communication system of the previous 3 embodiments, wherein:

the processing circuitry of the host computer is configured to execute a host application; and the UE's processing circuitry is configured to execute a client application associated with the host application, thereby providing the user data.

33. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

34. A method implemented in a communication system including a host computer, a network node and a user equipment (UE), the method comprising:

at the host computer, receiving user data transmitted to the base station from the UE, wherein the UE performs any of the steps of any of the Group B embodiments.

35. The method of the previous embodiment, further comprising, at the UE, providing the user data to the network node.

36. The method of the previous 2 embodiments, further comprising:

at the UE, executing a client application, thereby providing the user data to be transmitted; and at the host computer, executing a host application associated with the client application.

37. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

38. A communication system including a host computer comprising a communication interface configured to receive user data originating from a transmission from a user equipment (UE) to a network node, wherein the network node comprises a radio interface and processing circuitry, the network node's processing circuitry configured to perform any of the steps of any of the Group A embodiments.

39 The communication system of the previous embodiment further including the network node.

40. The communication system of the previous 2 embodiments, further including the UE, wherein the UE is configured to communicate with the network node.

41. The communication system of the previous 3 embodiments, wherein:

the processing circuitry of the host computer is configured to execute a host application;

the UE is configured to execute a client application associated with the host application, thereby providing the user data to be received by the host computer.

42. A method implemented in a communication system including a host computer, a network node and a user equipment (UE), the method comprising:

at the host computer, receiving, from the network node, user data originating from a transmission which the base station has received from the UE, wherein the UE performs any of the steps of any of the Group B embodiments.

43. The method of the previous embodiment, further comprising at the base station, receiving the user data from the UE.

44. The method of the previous 2 embodiments, further comprising at the network node, initiating a transmission of the received user data to the host computer.

REFERENCE 1. 3GPP ETSI TS38.104 "5G; NR; Base Station (BS) Radio Transmission and Reception" (version 15.3.0 Release 15).

Note: The content of this reference is hereby incorporated herein for all purposes.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ACLR Adjacent Channel Leakage Ratio
ARQ Automatic Repeat Request
AWGN Additive White Gaussian Noise
BCCH Broadcast Control Channel
BCH Broadcast Channel
BTS Base Transceiver Station
BSS Base Station Subsystem
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
ECGI Evolved CGI
EC-GSM-IoT Extended Coverage GSM-IoT
EDGE Enhanced Data rates for GSM Evolution
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
EVM Error Vector Magnitude
FDD Frequency Division Duplex
FFS For Further Study
GERAN GSM EDGE Radio Access Network
gNB Base station in NR
GNSS Global Navigation Satellite System
GPRS General Packet Radio Service
GSM Global System for Mobile communication
HARQ Hybrid Automatic Repeat Request
HO Handover
HSPA High Speed Packet Access
HRPD High Rate Packet Data
IoT Internet of Things
LLC Logical Link Control
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MS Mobile Station
MSC Mobile Switching Center
MTA Multilateration Timing Advance
MTC Machine Type Communication
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PDU Protocol Data Unit
PEO Power Efficient Operation
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RI Rank Information
RLC Radio Link Control
RLM Radio Link Management
RNC Radio Network Controller
RNTI Radio Network Temporary Identifier
RRC Radio Resource Control
RRLP Radio Resource Location services Protocol
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGSN Serving GPRS Support Node
SGW Serving Gateway
SI System Information SIB System Information Block
SMLC Serving Mobile Location Center
SNR Signal to Noise Ratio
SON Self Optimized Network
SS Synchronization Signal
SSS Secondary Synchronization Signal
TA Timing Advance
TBF Temporary Block Flow
TDD Time Division Duplex
TDOA Time Difference of Arrival
TLLI Temporary Logical Link Identifier
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network In view of the foregoing, it should be appreciated that embodiments described herein are illustrated by exemplary embodiments. It should also be appreciated that these embodiments are not mutually exclusive. That is, the components from one embodiment may be tacitly assumed to be present in another embodiment and it will be obvious to a person skilled in the art how those components may be used in the other exemplary embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that has been set forth and defined within the following claims.

The invention claimed is:

1. A network node configured to interact with a terminal node, the network node comprising:
- a processor; and
- a memory that stores processor-executable instructions, wherein the processor interfaces with the memory to execute the processor-executable instructions whereby the network node is operable to:
- compute an Error Vector Magnitude (EVM) of the network;
- determine a rank restriction, if any, for the terminal node based on (1) the computed EVM and (2) a geometry or path loss of the terminal node, wherein the determined rank restriction indicates a rank restriction required by the network node for transmitting data to the terminal node;
- communicate, to the terminal node, rank restriction information, wherein the rank restriction information is based on the determined rank restriction;
- receive, from the terminal node, a Channel State Information (CSI) report which includes preferred rank information within a rank restriction set, wherein the preferred rank information is associated with the rank restriction information;
- determine scheduling parameters for scheduling the terminal node, wherein the scheduling parameters-are determined using at least the preferred rank information in the CSI report;
- transmit, to the terminal node, the scheduling parameters; and,
- transmit, to the terminal node, the data based on the scheduling parameters,
- wherein the operation to communicate the rank restriction information to the terminal node comprises using higher level signalling to:
  - send a codebook subset restriction bit map with all lower ranks set to zero such that the terminal node upon receiving the codebook subset restriction bit map does not consider a specific rank hypothesis when the corresponding rank has a bit set to zero;
  - send a rank bit map where a rank associated with a bit set to zero indicates that the terminal node shall not consider a corresponding rank hypothesis; or inform implicitly that the terminal node is not to use rank 1 for CSI reporting.

2. The network node of claim 1, wherein the operation to compute the EVM further comprises:

measure the EVM at an output of a transmitter Radio Frequency (RF) front end of the network node.

3. The network node of claim 1, wherein the operation to compute the EVM further comprises:

estimate an Adjacent Channel Leakage Ratio (ACLR) at the network node; and, estimate the EVM based on the estimated ACLR.

4. The network node of claim 1, wherein the operation to determine the rank restriction further comprises:

determine whether the computed EVM satisfies a standardized EVM requirement for 256 QAM (Quadrature Amplitude Modulation);

based on the determination that the computed EVM satisfies the standardized EVM requirement for 256 QAM, determine that rank restriction is not applied;

based on the determination that the computed EVM does not satisfy the standardized EVM requirement for 256 QAM, determine whether the computed EVM satisfies a standardized EVM requirement for 64 QAM;

based on the determination that the computed EVM satisfies the standardized EVM requirement for 64 QAM, set a geometry threshold G_th to a first predetermined value and compute a geometry G of the terminal node;

based on the determination that the computed EVM does not satisfy the standardized EVM requirement for 64 QAM, determine whether the computed EVM satisfies a standardized EVM requirement for 16 QAM;

based on the determination that the computed EVM satisfies the standardized EVM requirement for 16 QAM, set the geometry threshold G_th to a second predetermined value that is less than the first predetermined value and compute a geometry G of the terminal node;

based on the determination that the computed EVM does not satisfy the standardized EVM requirement for 16 QAM, set the geometry threshold G_th to a third predetermined value that is less than the second predetermined value and compute a geometry G of the terminal node;

after performing the compute operation in which the geometry G of the terminal node is determined, determine whether the computed geometry G of the terminal node is greater or less than the set first, second, or third predetermined value of the geometry threshold G_th;

based on the determination that the computed geometry G of the terminal node is less than or equal to the set first, second, or third predetermined value of the geometry threshold G_th, determine that rank restriction is not applied to the terminal node; and, based on the determination that the computed geometry G of the terminal node is greater than the set first, second, or third predetermined value of the geometry threshold G_th, apply rank restriction to the terminal node.

5. The network node of claim 4, wherein the operation to compute the geometry G of the terminal node further comprises:

average over time multiple received CQI or CSI reports to estimate the geometry G of the terminal node.

6. The network node of claim 1, wherein the operation to determine the rank restriction further comprises:

determine whether the computed EVM satisfies a standardized EVM requirement for 256 QAM (Quadrature Amplitude Modulation);

based on the determination that the computed EVM satisfies the standardized EVM requirement for 256 QAM, determine that rank restriction is not applied;

based on the determination that the computed EVM does not satisfy the standardized EVM requirement for 256 QAM, determine whether the computed EVM satisfies a standardized EVM requirement for 64 QAM based on the determination that the computed EVM satisfies the standardized EVM requirement for 64 QAM, set a path loss threshold PL_th to a first predetermined value and compute a path loss PL of the terminal node;

based on the determination that the computed EVM does not satisfy the standardized EVM requirement for 64 QAM, determine whether the computed EVM satisfies a standardized EVM requirement for 16 QAM;

based on the determination that the computed EVM satisfies the standardized EVM requirement for 16 QAM, set the path loss threshold PL_th to a second predetermined value that is greater than the first predetermined value and compute a path loss PL of the terminal node;

based on the determination that the computed EVM does not satisfy the standardized EVM requirement for 16 QAM, set the path loss threshold PL_th to a third predetermined value that is greater than the second predetermined value and compute a path loss PL of the terminal node;

after performing the compute operation in which the path loss PL of the terminal node is determined, determine whether the computed path loss PL of the terminal node is greater or less than the set first, second, or third predetermined value of the path loss threshold PL_th;

based on the determination that the computed pass loss PL of the terminal node is greater than or equal to the set first, second, or third predetermined value of the path loss threshold PL_th, determine that rank restriction is not applied to the terminal node; and, based on the determination that the computed path loss PL of the terminal node is less than the set first, second, or third predetermined value of the path loss threshold PL_th, apply rank restriction to the terminal node.

7. The network node of claim 6, wherein the operation to compute the path loss PL of the terminal node further comprises:

compute the geometry of the terminal node by averaging over time multiple received CQI or CSI reports; and, calculate the path loss PL of the terminal node which is equal to 1/geometry.

8. A method performed by a network node which interacts with a terminal node, the method comprising:

computing an Error Vector Magnitude (EVM) of the network node;

determining a rank restriction, if any, for the terminal node based on (1) the computed EVM and (2) a geometry or path loss of the terminal node, wherein the determined rank restriction indicates a rank restriction required by the network node for transmitting data to the terminal node;

communicating, to the terminal node, rank restriction information, wherein the rank restriction information is based on the determined rank restriction;

receiving, from the terminal node, a Channel State Information (CSI) report which includes preferred rank information within a rank restriction set, wherein the preferred rank information is associated with the rank restriction information;

determining scheduling parameters for scheduling the terminal node, wherein the scheduling parameters are determined using at least the preferred rank information in the CSI report;

transmitting, to the terminal node, the scheduling parameters; and, transmitting, to the terminal node, the data based on the scheduling parameters, wherein the communicating the rank restriction information to the terminal node comprises using higher level signalling to:

send a codebook subset restriction bit map with all lower ranks set to zero such that the terminal node upon receiving the codebook subset restriction bit map does not consider a specific rank hypothesis when the corresponding rank has a bit set to zero;

send a rank bit map where a rank associated with a bit set to zero indicates that the terminal node shall not consider a corresponding rank hypothesis; or inform implicitly that the terminal node is not to use rank 1 for CSI reporting.

9. The method of claim 8, wherein the computing the EVM further comprises:

measuring the EVM at an output of a transmitter Radio Frequency (RF) front end of the network node.

10. The method of claim 8, wherein the computing the EVM further comprises:

estimating an Adjacent Channel Leakage Ratio (ACLR) at the network node; and, estimating the EVM based on the estimated ACLR.

11. The method of claim 8, wherein the determining the rank restriction further comprises:

determining whether the computed EVM satisfies a standardized EVM requirement for 256 QAM (Quadrature Amplitude Modulation);

based on the determination that the computed EVM satisfies the standardized EVM requirement for 256 QAM, determine that rank restriction is not applied;

based on the determination that the computed EVM does not satisfy the standardized EVM requirement for 256 QAM, determining whether the computed EVM satisfies a standardized EVM requirement for 64 QAM;

based on the determination that the computed EVM satisfies the standardized EVM requirement for 64 QAM, setting a geometry threshold G_th to a first predetermined value and computing a geometry G of the terminal node;

based on the determination that the computed EVM does not satisfy the standardized EVM requirement for 64 QAM, determining whether the computed EVM satisfies a standardized EVM requirement for 16 QAM;

based on the determination that the computed EVM satisfies the standardized EVM requirement for 16 QAM, setting the geometry threshold G_th to a second predetermined value that is less than the first predetermined value and computing a geometry G of the terminal node;

based on the determination that the computed EVM does not satisfy the standardized EVM requirement for 16 QAM, setting the geometry threshold G_th to a third predetermined value that is less than the second predetermined value and computing a geometry G of the terminal node;

after performing the computing step in which the geometry G of the terminal node is determined, determining whether the computed geometry G of the terminal node is greater or less than the set first, second, or third predetermined value of the geometry threshold G_th;

based on the determination that the computed geometry G of the terminal node is less than or equal to the set first, second, or third predetermined value of the geometry threshold G_th, determine that rank restriction is not applied to the terminal node; and, based on the determination that the computed geometry G of the terminal node is greater than the set first, second, or third predetermined value of the geometry threshold G_th, applying rank restriction to the terminal node.

12. The method of claim 11, wherein the computing the geometry G of the terminal node further comprises:

averaging over time multiple received CQI or CSI reports to estimate the geometry G of the terminal node.

13. The method of claim 8, wherein the determining the rank restriction further comprises:

determining whether the computed EVM satisfies a standardized EVM requirement for 256 QAM (Quadrature Amplitude Modulation);

based on the determination that the computed EVM satisfies the standardized EVM requirement for 256 QAM, determine that rank restriction is not applied;

based on the determination that the computed EVM does not satisfy the standardized EVM requirement for 256 QAM, determining whether the computed EVM satisfies a standardized EVM requirement for 64 QAM;

based on the determination that the computed EVM satisfies the standardized EVM requirement for 64 QAM, setting a path loss threshold PL_th to a first predetermined value and computing a path loss PL of the terminal node;

based on the determination that the computed EVM does not satisfy the standardized EVM requirement for 64 QAM, determining whether the computed EVM satisfies a standardized EVM requirement for 16 QAM;

based on the determination that the computed EVM satisfies the standardized EVM requirement for 16 QAM, setting the path loss threshold PL_th to a second predetermined value that is greater than the first predetermined value and computing a path loss PL of the terminal node;

based on the determination that the computed EVM does not satisfy the standardized EVM requirement for 16 QAM, setting the path loss threshold PL_th to a third predetermined value that is greater than the second predetermined value and compute a path loss PL of the terminal node;

after performing the computing step in which the path loss PL of the terminal node is determined, determining whether the computed path loss PL of the terminal node is greater or less than the set first, second, or third predetermined value of the path loss threshold PL_th;

based on the determination that the computed pass loss PL of the terminal node is greater than or equal to the set first, second, or third predetermined value of the path loss threshold PL_th, determine that rank restriction is not applied to the terminal node; and, based on the determination that the computed path loss PL of the terminal node is less than the set first, second, or third predetermined value of the path loss threshold PL_th, applying rank restriction to the terminal node.

14. The method of claim 13, wherein the computing the path loss PL of the terminal node further comprises:

computing the geometry of the terminal node by averaging over time multiple received CQI or CSI reports; and calculating the path loss PL of the terminal node which is equal to 1/geometry.

15. A terminal node configured to interact with a network node, the terminal node comprising:

a processor; and a memory that stores processor-executable instructions, wherein the processor interfaces with the memory to execute the processor-executable instructions whereby the terminal node is operable to:

receive, from the network node, rank restriction information which indicates the rank restriction required by the network node for transmitting data to the terminal node;

compute a Channel State Information (CSI) report which includes preferred rank information within a rank restriction set, wherein the preferred rank information is based on the received rank restriction information;

communicate, to the network node, the computed CSI report including the preferred rank information;

receive, from the network node, scheduling parameters on a downlink control channel, wherein the scheduling parameters are based in part on the preferred rank information in the CSI report; and, receive, from the network node, the data, wherein the operation to receive the rank restriction information from the network node comprises:

receiving, via higher level signalling, a codebook subset restriction bit map with all lower ranks set to zero such that the terminal node upon receiving the codebook subset restriction bit map does not consider a specific rank hypothesis when the corresponding rank has a bit set to zero;

receiving, via higher level signalling, a rank bit map where a rank associated with a bit set to zero indicates that the terminal node shall not consider a corresponding rank hypothesis; or being informed, via higher level signalling, implicitly that the terminal node is not to use rank 1 for CSI reporting.

16. The terminal node of claim 15, wherein the operation of compute the CSI report further comprises:

choose the best Channel Quality Indicator (CQI) from those ranks as specified in the rank restriction information provided by the network node.

17. A method in a terminal node which interacts with a network node, the method comprising:

receiving, from the network node, rank restriction information which indicates the rank restriction required by the network node for transmitting data to the terminal node;

computing a Channel State Information (CSI) report which includes preferred rank information within a rank restriction set, wherein the preferred rank information is based on the received rank restriction information;

communicating, to the network node, the computed CSI report including the preferred rank information;

receiving, from the network node, scheduling parameters on a downlink control channel, wherein the scheduling parameters are based in part on the preferred rank information in the CSI report; and, receiving, from the network node, the data, wherein the receiving the rank restriction information from the network node comprises:

receiving, via higher level signalling, a codebook subset restriction bit map with all lower ranks set to zero such that the terminal node upon receiving the codebook subset restriction bit map does not consider a specific rank hypothesis when the corresponding rank has a bit set to zero;

receiving, via higher level signalling, a rank bit map where a rank associated with a bit set to zero indicates that the terminal node shall not consider a corresponding rank hypothesis; or being informed, via higher level signalling, implicitly that the terminal node is not to use rank 1 for CSI reporting.

18. The method of claim 17, wherein the computing the CSI report further comprises:

choosing the best Channel Quality Indicator (CQI) from those ranks as specified in the rank restriction information provided by the network node.

* * * * *